United States Patent
Lin et al.

(10) Patent No.: US 11,035,724 B2
(45) Date of Patent: Jun. 15, 2021

(54) OPTICAL SENSING CIRCUIT

(71) Applicants: AU Optronics Corporation, Hsin-Chu (TW); NATIONAL CHENG KUNG UNIVERSITY, Tainan (TW)

(72) Inventors: Chih-Lung Lin, Hsin-Chu (TW); Fu-Hsing Chen, Hsin-Chu (TW); Chia-Lun Lee, Hsin-Chu (TW); Chia-En Wu, Hsin-Chu (TW); Jian-Shen Yu, Hsin-Chu (TW)

(73) Assignees: AU OPTRONICS CORPORATION, Hsin-Chu (TW); NATIONAL CHENG KUNG UNIVERSITY, Tainan (TW)

(*) Notice: Subject to any disclaimer, the term of this patent is extended or adjusted under 35 U.S.C. 154(b) by 61 days.

(21) Appl. No.: 16/590,961

(22) Filed: Oct. 2, 2019

(65) Prior Publication Data

US 2020/0158567 A1    May 21, 2020

(30) Foreign Application Priority Data

Nov. 19, 2018 (TW) .................................. 107141105

(51) Int. Cl.
  *G01J 1/46*   (2006.01)
  *G01J 1/04*   (2006.01)
  *G01J 1/42*   (2006.01)

(52) U.S. Cl.
  CPC .............. *G01J 1/46* (2013.01); *G01J 1/0488* (2013.01); *G01J 1/4228* (2013.01)

(58) Field of Classification Search
  CPC ........ G01J 1/46; G01J 1/44; G01J 1/42; G01J 1/0488; G01J 1/0492; G01J 1/04; G01J 1/02; G01J 1/4228; G01J 2001/4233; G01J 1/0214; G01J 2001/4473
  See application file for complete search history.

(56) References Cited

U.S. PATENT DOCUMENTS

| | | | | |
|---|---|---|---|---|
| 7,205,830 | B2* | 4/2007 | Gangasani | G05F 3/262 327/389 |
| 8,325,155 | B2* | 12/2012 | Chang | G06F 3/0412 345/175 |
| 8,564,579 | B2* | 10/2013 | Kwon | G01J 1/46 345/207 |
| 8,686,479 | B2* | 4/2014 | Hynecek | H01L 27/14621 257/222 |
| 9,631,975 | B2* | 4/2017 | Yu | G01J 1/44 |
| 10,175,098 | B2* | 1/2019 | Lin | G01J 1/0214 |
| 2004/0032926 | A1* | 2/2004 | Yu | G11C 19/28 377/64 |
| 2007/0188196 | A1* | 8/2007 | Yu | H03K 19/01714 326/88 |

(Continued)

*Primary Examiner* — John R Lee
(74) *Attorney, Agent, or Firm* — WPAT, PC

(57) ABSTRACT

An optical sensing circuit includes a first light sensor, a second light sensor, a third light sensor, a capacitor, and a sampling circuit. The first light sensor, the second light sensor, and the third light sensor are respectively covered by a first color filter, a second color filter, and a third color filter. The first light sensor is coupled to the capacitor, the sampling circuit, and the third light sensor. The second light sensor is coupled to the first light sensor and is configured to receive a first sensing signal. The third light sensor is coupled between the first light sensor and a voltage source.

10 Claims, 22 Drawing Sheets

(56) References Cited

U.S. PATENT DOCUMENTS

| | | | |
|---|---|---|---|
| 2009/0141202 A1* | 6/2009 | Yoshida | G09G 3/3648 349/38 |
| 2010/0156847 A1 | 6/2010 | No et al. | |
| 2011/0063243 A1 | 3/2011 | Kim et al. | |
| 2013/0127792 A1* | 5/2013 | Chang | G06F 3/03542 345/179 |
| 2016/0020337 A1* | 1/2016 | Yu | G01J 1/44 250/226 |
| 2016/0370224 A1* | 12/2016 | Liu | H01L 27/14601 |
| 2017/0276541 A1* | 9/2017 | Lin | G06F 3/042 |
| 2020/0158567 A1* | 5/2020 | Lin | G01J 3/513 |
| 2020/0326234 A1* | 10/2020 | Tzeng | G01J 1/44 |

\* cited by examiner

OPTICAL SENSING CIRCUIT

RELATED APPLICATIONS

This application claims priority to Taiwanese Application Serial Number 107141105, filed Nov. 19, 2018, which is herein incorporated by reference.

BACKGROUND

Technical Field

The present disclosure relates to an optical sensing circuit. More particularly, the present disclosure relates to a mixed color light optical sensing circuit.

Description of Related Art

Optical sensing circuit is configured to output different results according to detected color light. However, since ambient light includes all color light, the ambient light may make the optical sensing circuit output wrong results. Thus, how to ensure the optical sensing circuit to output correct sensing results is an issue that needs to be addressed.

SUMMARY

One embodiment of the present disclosure is related to an optical sensing circuit. The optical sensing circuit includes a first light sensor, a capacitor, a capacitor, a second light sensor, a third light sensor, and a sampling circuit. The first light sensor includes a first terminal and a second terminal. The first light sensor is covered by a first color filter. The first color filter is configured to transmit a first color light. The capacitor includes a first terminal and a second terminal. The first terminal of the capacitor is coupled to the first terminal of the first light sensor. The second terminal of the capacitor is coupled to a voltage source. The second light sensor includes a first terminal and a second terminal. The first terminal of the second light sensor is coupled to the second terminal of the first light sensor. The second terminal of the second light sensor is configured to receive a first sensing signal. The second light sensor is covered by a second color filter. The second color filter is configured to transmit a second color light. The third light sensor includes a first terminal and a second terminal. The first terminal of the third light sensor is coupled to the voltage source. The second terminal of the third light sensor is coupled to the first terminal of the first light sensor and the first terminal of the capacitor. The third light sensor is covered by a third color filter. The third color filter is configured to transmit a third color light. The sampling circuit is coupled to the first terminal of the first light sensor, the second terminal of the third light sensor, and the first terminal of the capacitor. The sampling circuit is configured to receive a first sampling signal. The sampling circuit outputs a voltage at the first terminal of the capacitor according to the first sampling signal.

As the above embodiments, the optical sensing circuit is able to have corresponding operations by different irradiated color light.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
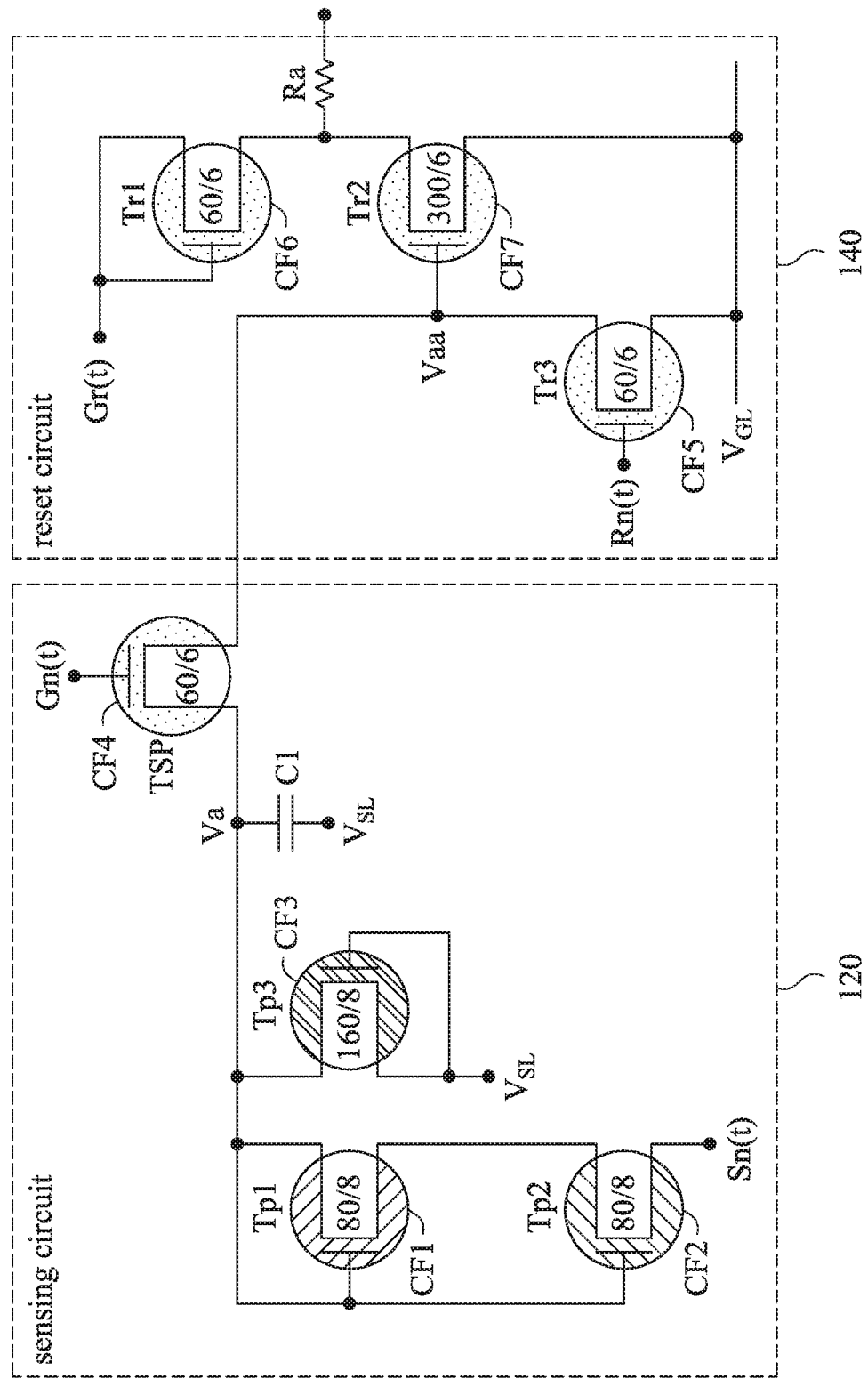
FIG. 1 is a schematic diagram illustrating an optical sensing circuit according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

The terms "comprises", "comprising", "includes", "including", "has", "having" . . . etc. used in the present disclosure are open type and their meaning are "comprises but not limited." Besides, the term "and/or" includes any one of listed items and all combination thereof.

In the present disclosure, "connected" or "coupled" may refer to "electrically connected" or "electrically coupled." "Connected" or "coupled" may also refer to operations or actions between two or more elements. In addition, although the terms "first", "second" . . . etc. in the present disclosure are used to describe different elements, these terms are merely configured to distinguish elements or operations described with same technical term. Unless it is clear in context, the terms do not refer to order or sequence and are not configured to limit the present disclosure.

Reference is now made to FIG. 1. FIG. 1 is a schematic diagram illustrating an optical sensing circuit according to a first embodiment of the present disclosure. The optical sensing circuit 100 includes a sensing circuit 120 and a reset circuit 140. The sensing circuit 120 includes a first light sensor Tp1, a second light sensor Tp2, a third light sensor Tp3, a capacitor C1, and a sampling circuit TSP. The first light sensor Tp1 is covered by a first color filter CF1. For convenience to indicate, the first color filter CF1 is indicated by left oblique lines. The first color filter CF1 is configured to transmit first color light. The first color is, for example, red color light. Compared to other color light, light having wavelength from 620-750 nm is easier to be transmitted through the first color filter CF1. The numbers indicated on the first light sensor Tp1 represent a channel width and a channel length of a transistor element. To clearly indicate the channel width and the channel length, the first color filter CF1 is not fully illustrated on the first light sensor Tp1. In other embodiments of the present disclosure, the color filters CF2-CF9 are not fully illustrated on the light sensors due to convenience for viewing, and this is not described in the following description. In this embodiment, numbers 80/8 indicated on the first light sensor Tp1 and the second light sensor Tp2 represent that the channel widths of the transistors are 80 μm and the channel lengths of the transistors are 8 μm. The first light sensor Tp1 includes a first terminal, a second terminal, and a control terminal. The first terminal of the first light sensor Tp1 is coupled to the control terminal of the first light sensor Tp1. The capacitor C1 includes a first terminal and a second terminal. The first terminal of the capacitor C1 is coupled to the first terminal of the first light sensor Tp1 and the control terminal of the first light sensor Tp1. The second terminal of the capacitor C1 is coupled to a voltage source. The sampling circuit TSP is coupled to the first terminal of the capacitor C1, the first terminal of the first light sensor Tp1, and the control terminal of the first light sensor Tp1. The sampling circuit TSP is covered by the fourth color filter CF4. The fourth color filter CF4 is indicated by a spot diagram. The fourth color filter CF4 is configured to block all color light of all wavelengths. The second light sensor Tp2 is covered by the second color filter CF2. The second color filter CF2 is indicated by right oblique lines. The second color filter CF2 is configured to transmit second color light. The second color light is, for example, blue color light. The second light sensor Tp2 includes a first terminal, a second terminal, and a control terminal. The first terminal of the second light sensor Tp2 is coupled to the second terminal of the first light sensor Tp1. The second terminal of the second light sensor Tp2 is coupled to a first sensing signal Sn(t). The control terminal of the second light sensor Tp2 is coupled to the control terminal of the first light sensor Tp1 and the first terminal of the second light sensor Tp2. The third light sensor Tp3 is covered by the third color filter CF3. The third color filter CF3 is indicated by double right oblique lines. The third color filter CF3 is configured to transmit third color light. The third color light is, for example, green color light. In this embodiment, numbers 160/8 indicated on the third light sensor Tp3 represent that the channel width of the transistor is 160 μm and the channel length of the transistor is 8 μm. The third light sensor Tp3 includes a first terminal, a second terminal, and a control terminal. The first terminal of the third light sensor Tp3 is coupled to the first terminal of the first light sensor Tp1, the control terminal of the first light sensor Tp1, and the first terminal of the capacitor C1. The second terminal of the third light sensor Tp3 is coupled to the control terminal of the third light sensor Tp3 and the voltage source.

The reset circuit 140 includes a transistor Tr1, a transistor Tr2, a transistor Tr3, and a resistor Ra. The transistor Tr1 is covered by the sixth color filter CF6, the transistor Tr2 is covered by the seventh color filter CF7, and the transistor Tr3 is covered by the fifth color filter CF5. The fifth color filter CF5, the sixth color filter CF6, and the seventh color filter CF7 are configured to block all color light of all wavelengths. The fifth color filter CF5, the sixth color filter CF6, and the seventh color filter CF7 are indicated by spot diagrams. The transistor Tr1 includes a first terminal, a second terminal, and a control terminal. The first terminal and the control terminal of the transistor Tr1 are coupled to a second sampling signal Gr(t). The second terminal of the transistor Tr1 is coupled to the resistor Ra. The transistor Tr2 includes a first terminal, a second terminal, and a control terminal. The first terminal of the transistor Tr2 is coupled to the resistor Ra and the second terminal of the transistor Tr1. The second terminal of the transistor Tr2 is coupled to a low voltage $V_{GL}$. The control terminal of the transistor Tr2 is coupled to the sampling circuit TSP. The transistor Tr3 includes a first terminal, a second terminal, and a control terminal. The first terminal of the transistor Tr3 is coupled to the control terminal of the transistor Tr2 and the sampling circuit TSP. The second terminal of the transistor Tr3 is coupled to a low voltage $V_{GL}$. The control terminal of the transistor Tr3 is configured to receive a reset signal Rn(t). It is noted that, in this embodiment, the channel width of the transistor Tr2 is larger than the channel width of the transistor Tr1. For example, the channel width of the transistor Tr2 is 300 μm and the channel width of the transistor Tr1 is 60 μm, but the present disclosure is not limited thereto.

In above embodiment, the transistor Tr1, the transistor Tr2, and transistor Tr3 serve as switch elements of the reset circuit 140, but the present disclosure is not limited thereto. In other embodiments, the reset circuit 140 may adopt other elements having the same functions. The person skilled in the art may understand how to replace the above switch elements. Different switch elements are within the scope of the present disclosure.

In the embodiment in FIG. 1, transistors are taken as examples of the first light sensor Tp1, the second light sensor Tp2, and the third light sensor Tp3 for illustration. The transistors may be, for example, bipolar junction transistors (BJTs) or field effect transistors (FETs), such as thin-film transistors (TFTs). In this embodiment, the first light sensor Tp1, the second light sensor Tp2, and the third light sensor Tp3 are N type TFTs, but the present disclosure is not limited thereto. Other transistors may be used to be the first light sensor Tp1, the second light sensor Tp2, and the third light sensor Tp3. As illustrated in FIG. 1, when non-conductive signal is transmitted to the control terminal (for example, gate terminal) of each of the first light sensor Tp1, the second light sensor Tp2, and the third light sensor Tp3 (for example, the low voltage $V_{SL}$ is transmitted to the control terminal), the voltage difference (gate-to-source voltage, $V_{GS}$) between the control terminal and the second terminal (for example, source terminal) is lower than the threshold voltage ($V_{TH}$) of the transistor. Thus, the transistor operates in a cut-off region, and the cut-off region is also referred to as subthreshold region. At this time, different illumination and input signal will affect the leakage current of the transistor, and the leakage current is also referred to as subthreshold leakage.

The first light sensor Tp1, the second light sensor Tp2, and the third light sensor Tp3 are respectively covered by the first color filter CF1, the second color filter CF2, and the third color filter CF3. These color filters are configured to make the first light sensor Tp1, the second light sensor Tp2, and the third light sensor Tp3 sense color light of specific wavelength. In FIG. 1, these color filters are illustrated by circles, and different line types distinguish the color filters with different functions. For example, left oblique lines type is for the color filter which transmits the red color light, right oblique lines type is for the color filter which transmits the blue color light, double right oblique lines type is for the color filter which transmits the green color light, and spot type is for the color filter which blocks all color light of all wavelength. The color light transmitted through the different color filters is not limited as above. Different types are used for the purpose of view and illustration, and they do not represent the real condition.

The capacitor C1 is coupled to the first light sensor Tp1, the third light sensor Tp3, and the voltage source. In this embodiment, a charge-type optical sensing circuit is taken as an example, so the voltage source adopts the low voltage $V_{SL}$. If the optical sensing circuit is a discharge-type optical sensing circuit, the voltage source may be arranged to be a high voltage $V_{SH}$. In the following embodiments, $V_{SH}$ represents a high voltage, and $V_{SL}$ represents a low voltage. For example, for a circuit whose supply voltage is 1.8 V, the high voltage may be 1.8V, and the low voltage may be 0V. In addition, the first sampling signal Gn(t) of the sampling circuit TSP, the second sampling signal Gr(t) and the reset signal Rn(t) of the reset circuit 140 adopt $V_{GH}$ and $V_{GA}$ to represent the high voltage and the low voltage.

The sampling circuit TSP is configured to output a sensing voltage Va to the reset circuit 140. FIG. 1 uses one transistor to be an example of the sampling circuit TSP. The sampling circuit TSP may be other circuit which continuously or discretely samples the sensing voltage Va.

Figure 2:
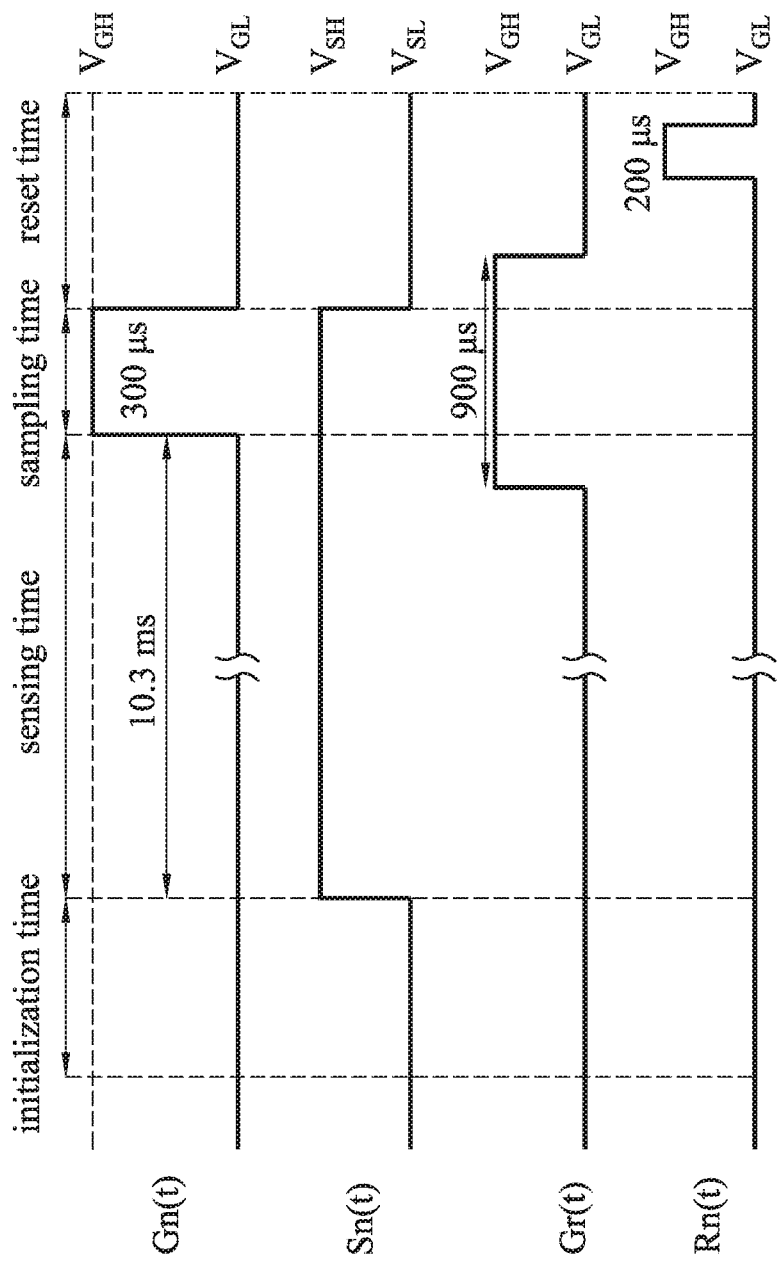
FIG. 2 is a timing diagram illustrating signals of the optical sensing circuit in FIG. 1.
Figure 3:
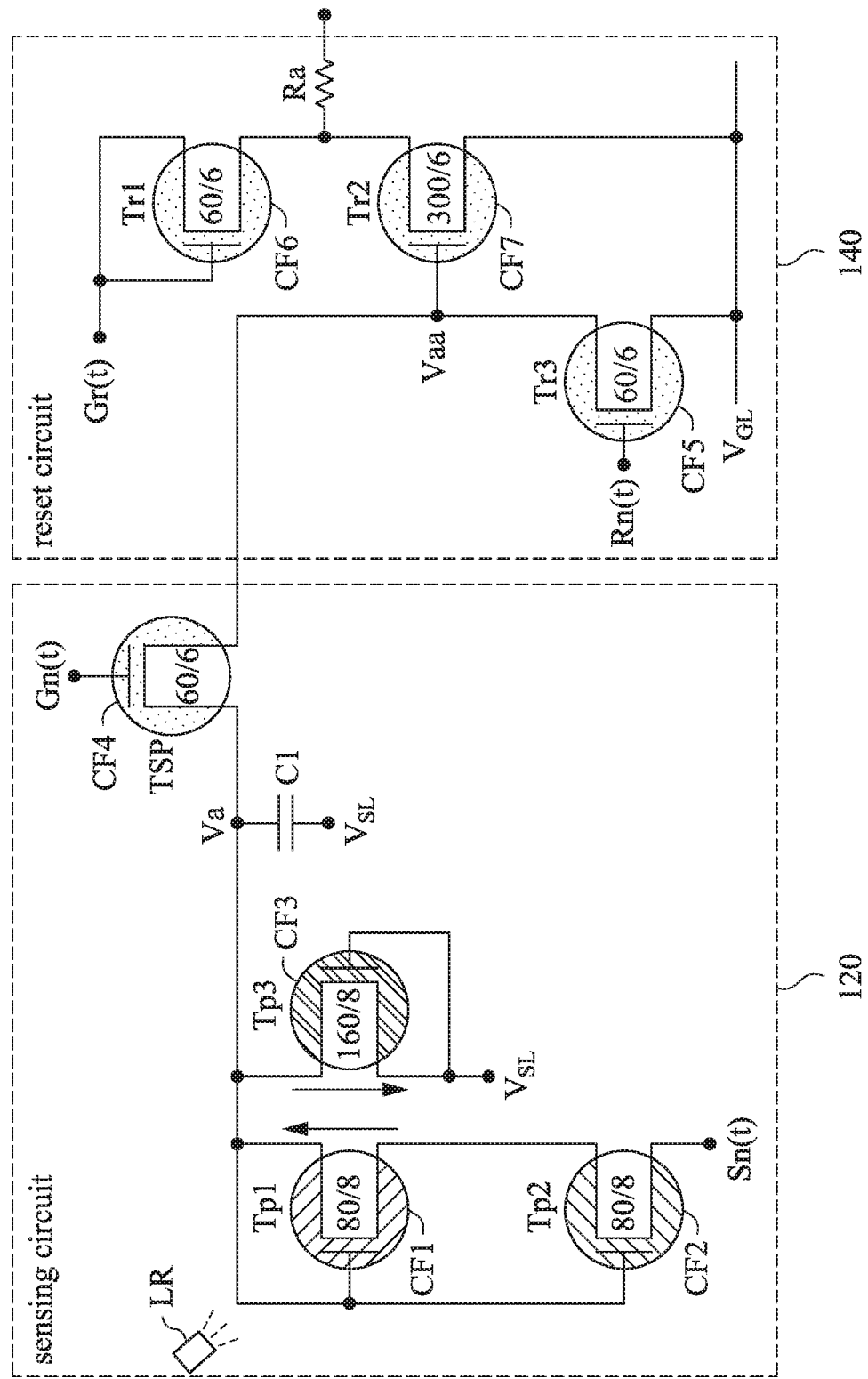
FIG. 3 is a schematic diagram illustrating operations of the optical sensing circuit illustrated by first color light according to the first embodiment of the present disclosure.
Figure 4:
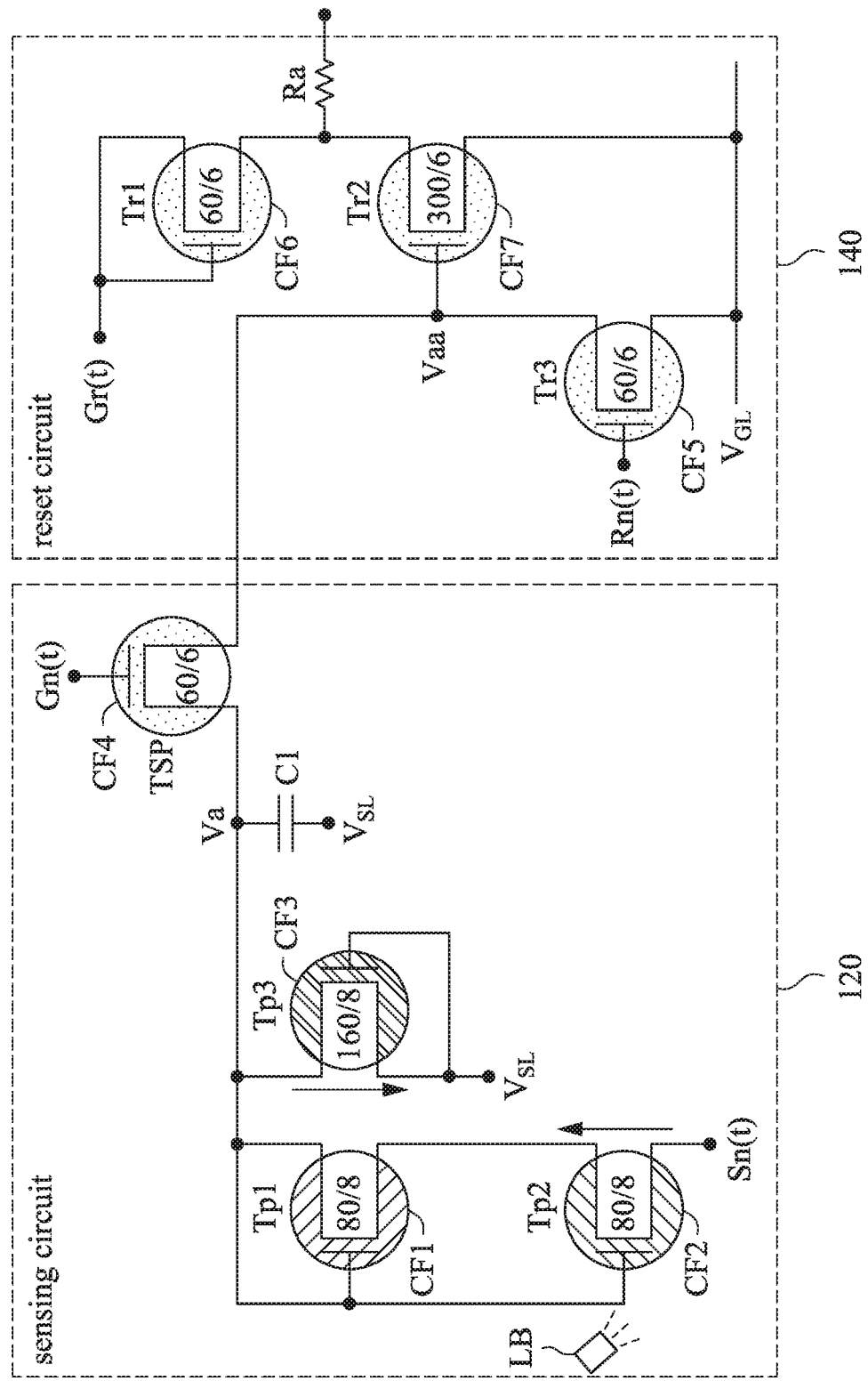
FIG. 4 is a schematic diagram illustrating operations of the optical sensing circuit illustrated by second color light according to the first embodiment of the present disclosure.
Figure 5:
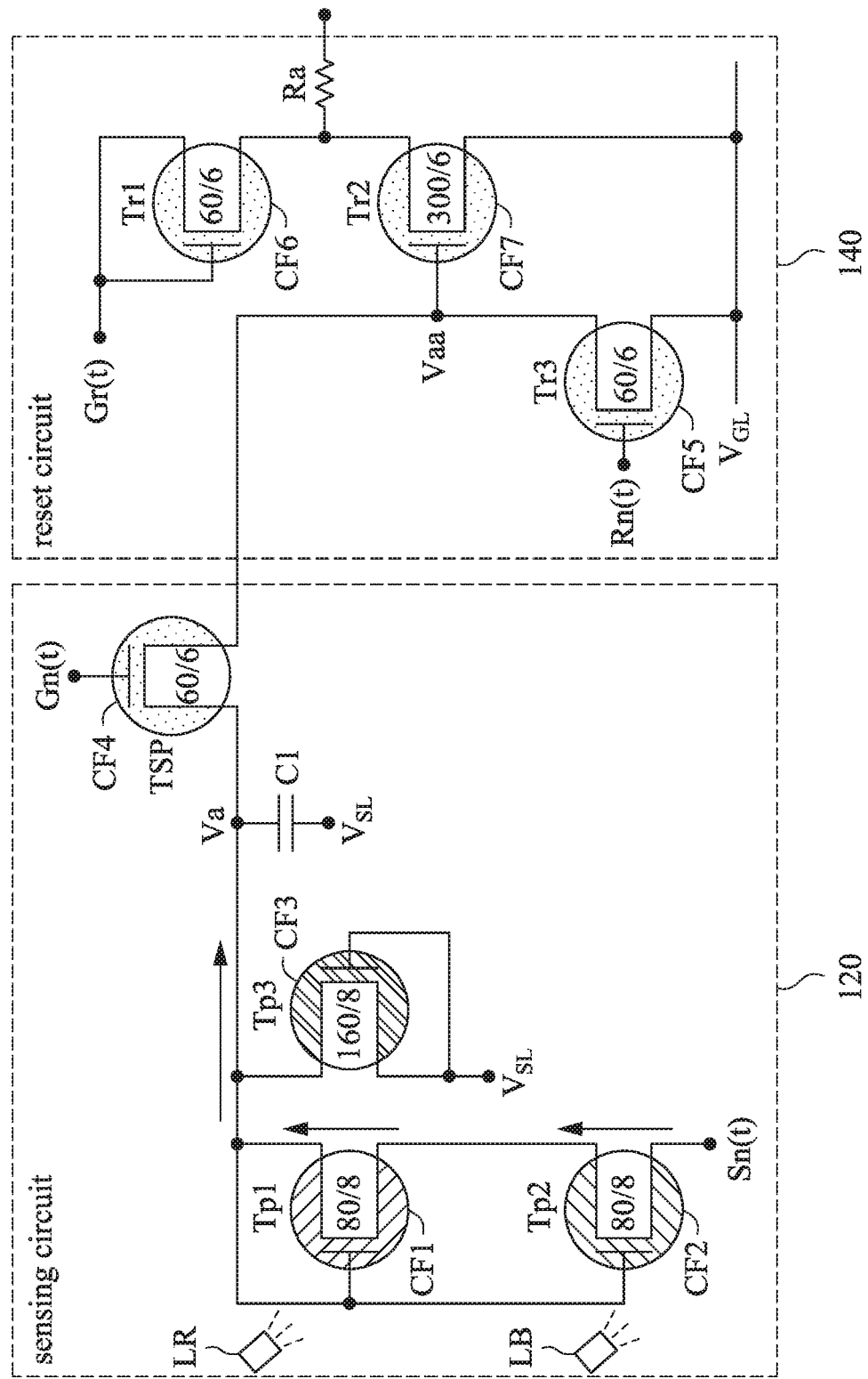
FIG. 5 is a schematic diagram illustrating operations of the optical sensing circuit illustrated by the first color light and the second color light according to the first embodiment of the present disclosure.
Figure 6:
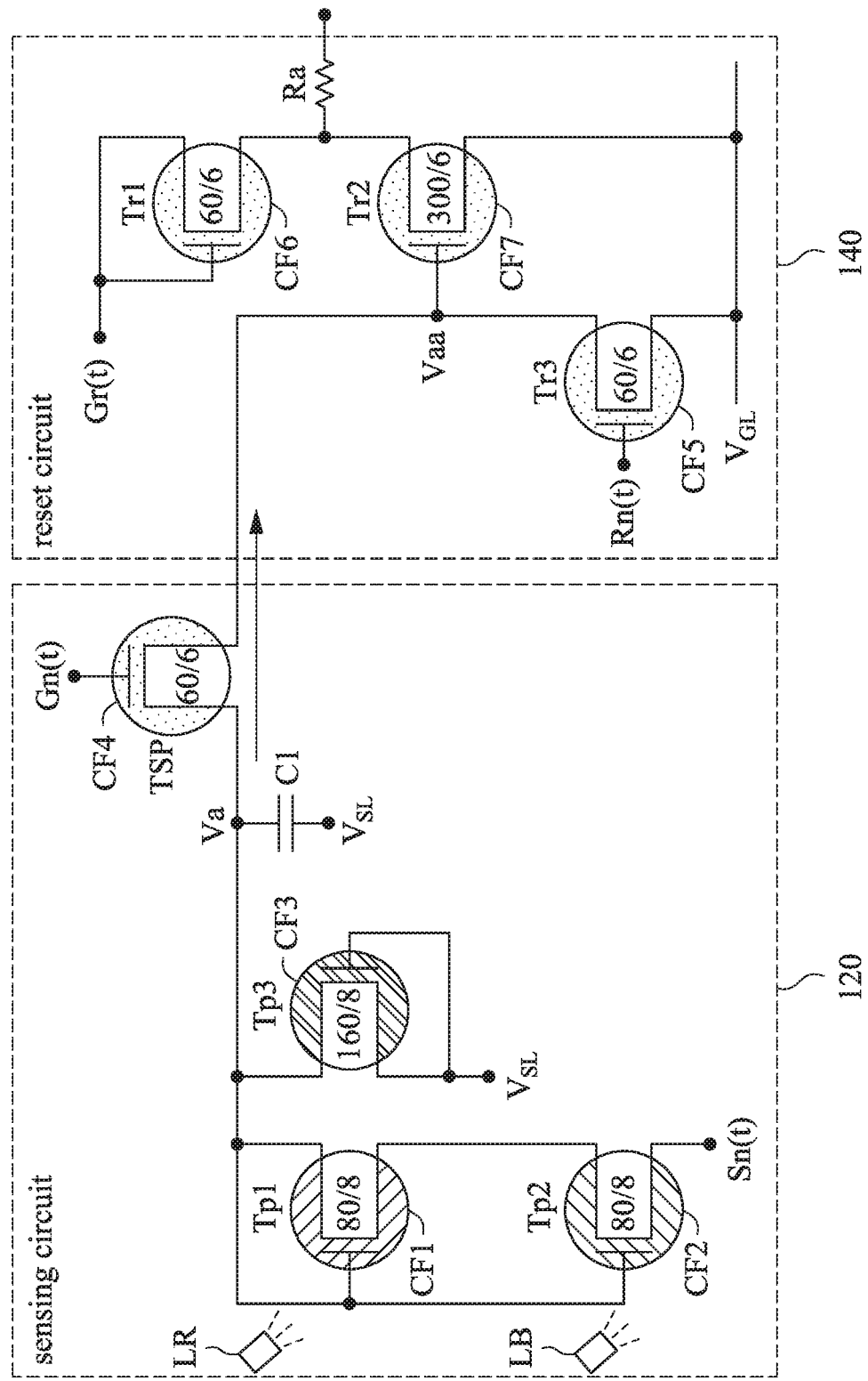
FIG. 6 is a schematic diagram illustrating operations of the optical sensing circuit during a sampling time according to the first embodiment of the present disclosure.

Various embodiments of the present disclosure are described in following description. References are made to FIGS. 1-6. FIG. 1 is a schematic diagram illustrating an optical sensing circuit according to a first embodiment of the present disclosure. FIG. 2 is a timing diagram illustrating signals of the optical sensing circuit in FIG. 1. FIG. 3 is a schematic diagram illustrating operations of the optical sensing circuit illustrated by first color light according to the first embodiment of the present disclosure. FIG. 4 is a schematic diagram illustrating operations of the optical sensing circuit illustrated by second color light according to the first embodiment of the present disclosure. FIG. 5 is a schematic diagram illustrating operations of the optical sensing circuit illustrated by the first color light and the second color light according to the first embodiment of the present disclosure. FIG. 6 is a schematic diagram illustrating operations of the optical sensing circuit during a sampling time according to the first embodiment of the present disclosure. In one embodiment, when a transistor operates in the cut-off region, the transistor illuminated by exterior light source would generate the leakage current. In addition to illumination, the leakage current is also associated with the channel width. When the channel width of the transistor is larger, the leakage current is larger.

The following description illustrates a condition that the sensing circuit 120 is not illuminated by exterior color light and there is only ambient white light. Because the ambient white light includes all color light, the transistor would generate the leakage current when the ambient white light becomes stronger. In this embodiment, the channel widths of the first light sensor Tp1 and the second light sensor Tp2 are 80 μm and the channel width of the third light sensor Tp3 is 160 μm, but the design of the channel widths of the first light sensor Tp1, the second light sensor Tp2, and the third light sensor Tp3 are not limited thereto. The channel widths of the first light sensor Tp1, the second light sensor Tp2, and the third light sensor Tp3 may be implemented by other design. The first light sensor Tp1 and the second light sensor Tp2 form a series-connection structure. Because the channel width of the third light sensor Tp3 is larger than the channel width of the first light sensor Tp1 and larger than the channel width of the second light sensor Tp2, when the ambient white light becomes stronger to make the first light sensor Tp1, the second light sensor Tp2, and the third light sensor Tp3 generate current during a sensing time, the current flowing through the second light sensor Tp2 is equal to the current flowing through the first light sensor Tp1 and equal to the current flowing through the third light sensor Tp3 based on a node analysis of the sensing voltage Va according to the Kirchhoff's current law (KCL). Thus, the sensing voltage Va is approximately equal to the low voltage $V_{SL}$ under the ambient white light. The capacitor C1 is prevented from being charged when there is only the ambient white light. Because the first light sensor Tp1 and the second light sensor Tp2 form the series-connection structure, the sensing voltage Va being the low voltage $V_{SL}$ would make the control terminals of the first light sensor Tp1 and the second light sensor Tp2 be kept to the low voltage, thereby limiting the currents of the first light sensor Tp1 and the second light sensor Tp2.

The following description illustrates a condition that the sensing circuit 120 is illuminated by red color light LR. Reference is made to FIG. 3. Because the first color light CF1 is configured to transmit the red color light, light which affects the sensing circuit 120 is the ambient white light and the red color light LR when the sensing circuit 120 is illuminated by the red color light LR. Thus, the first light sensor Tp1 generates a current. However, because the series-connected second light sensor Tp2 limits the current of the first light sensor Tp1, the current flows toward the third light sensor Tp3. Similar to the condition that there is only the ambient white light, the sensing voltage Va is kept to the low voltage $V_{SL}$ to reduce charging of the capacitor C1 when the sensing circuit 120 is only illuminated by the red color light LR.

The following description illustrates a condition that the sensing circuit 120 is illuminated by blue color light LB. Reference is made to FIG. 4. Similar to the condition of being illuminated by the red color light LR. Because the second color light CF2 is configured to transmit blue color light, when the sensing circuit 120 is illuminated by the blue color light LB, the second light sensor Tp2 generates a current. However, because the series-connected first light sensor Tp1 limits the current of the second light sensor Tp2, the current flows toward the third light sensor Tp3. Thus, the sensing voltage Va is kept to the low voltage $V_{SL}$ to reduce charging of the capacitor C1 when the sensing circuit 120 is only illuminated by the blue color light LB.

The following description illustrates a condition that the sensing circuit 120 is simultaneously illuminated by the red color light LR and the blue color light LB. Reference is made to FIG. 5. Unlike the condition of being illuminated by single color light, the current generated by the first light sensor Tp1 and the second light sensor Tp2 is larger than the current generated by the third light sensor Tp3 when the sensing circuit 120 is simultaneously illuminated by the red color light LR and the blue color light LB. Thus, the sensing voltage Va is kept to the high voltage $V_{SH}$ and the capacitor C1 is charged.

Reference is made to FIG. 6. During the sampling time, the second sampling signal Gr(t) is a high voltage $V_{GH}$ to make the transistor Tr1 be turned on. When the second sampling signal Gr(t) is the high voltage $V_{GH}$, the sampling circuit TSP outputs the sensing voltage Va to a node Vaa of the reset circuit 140 to make the transistor Tr2 be turned on and make a voltage of the resistor Ra be approximately equal to the low voltage $V_{GA}$. During the reset time, the reset signal Rn(t) is the high voltage $V_{GH}$, and the transistor Tr3 is turned on to reset a voltage at the node Vaa to be the low voltage $V_{GA}$.

Figure 7:
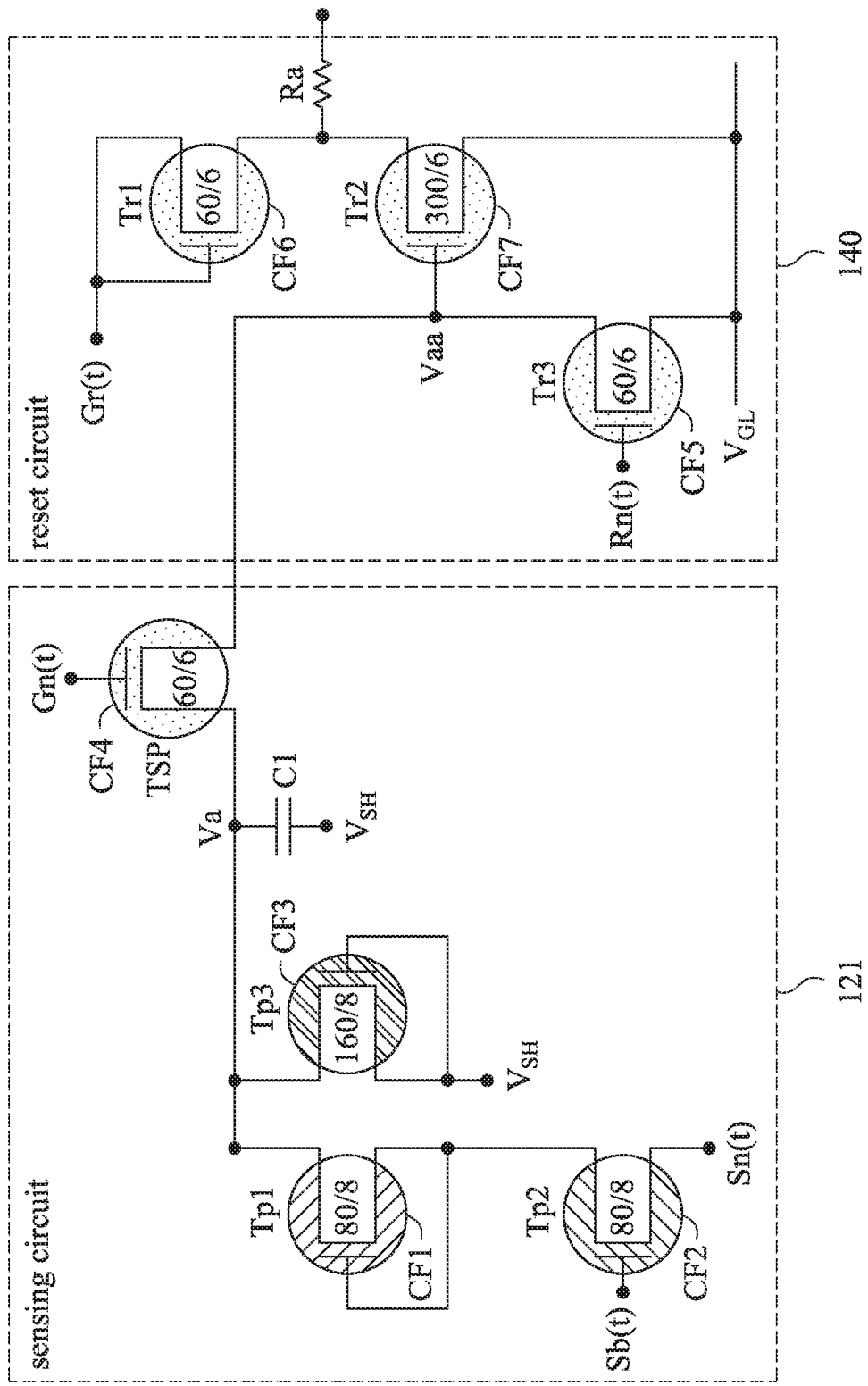
FIG. 7 is a schematic diagram illustrating an optical sensing circuit according to a second embodiment of the present disclosure.
Figure 8:
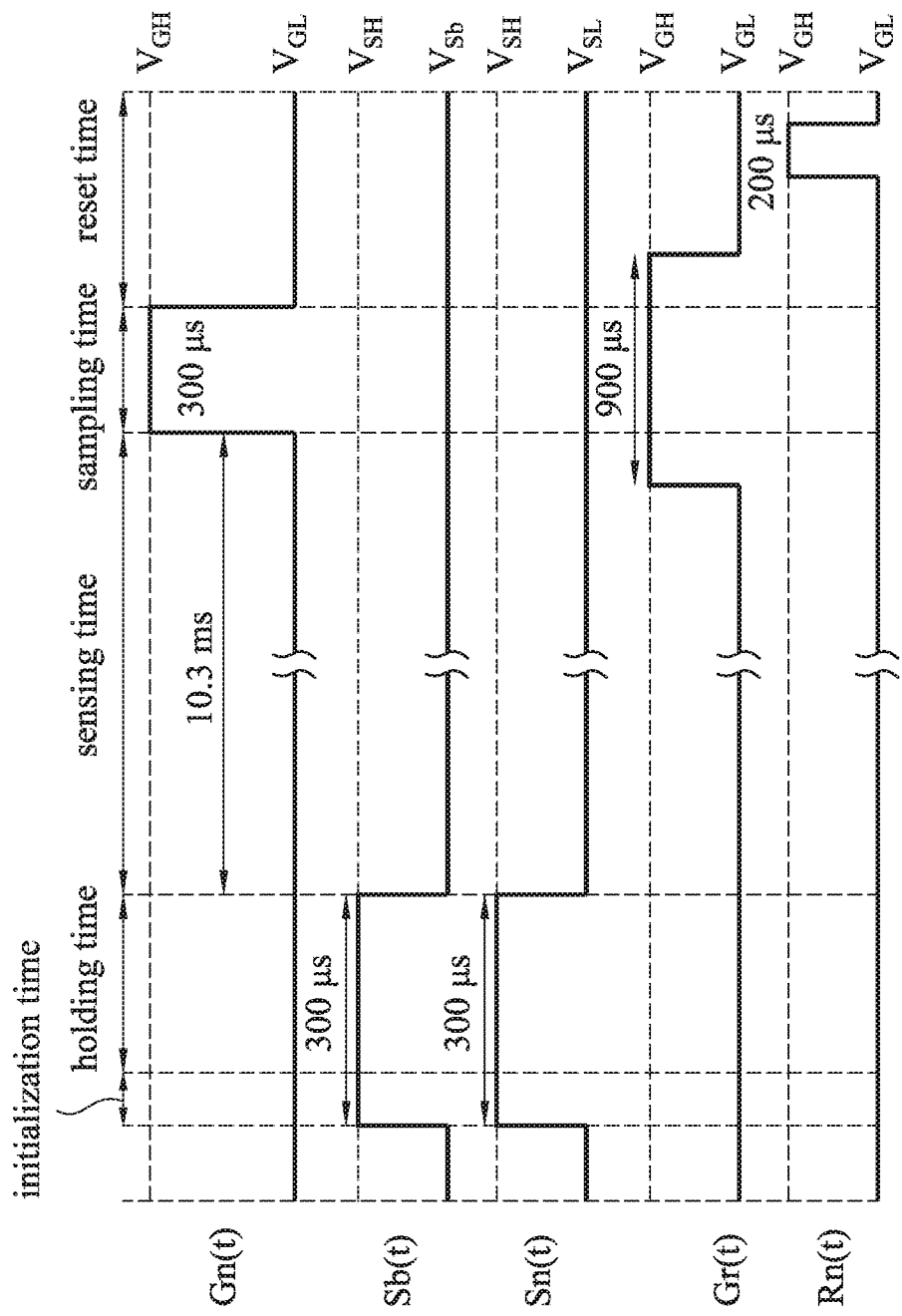
FIG. 8 is a timing diagram illustrating signals of the optical sensing circuit in FIG. 7.
Figure 9:
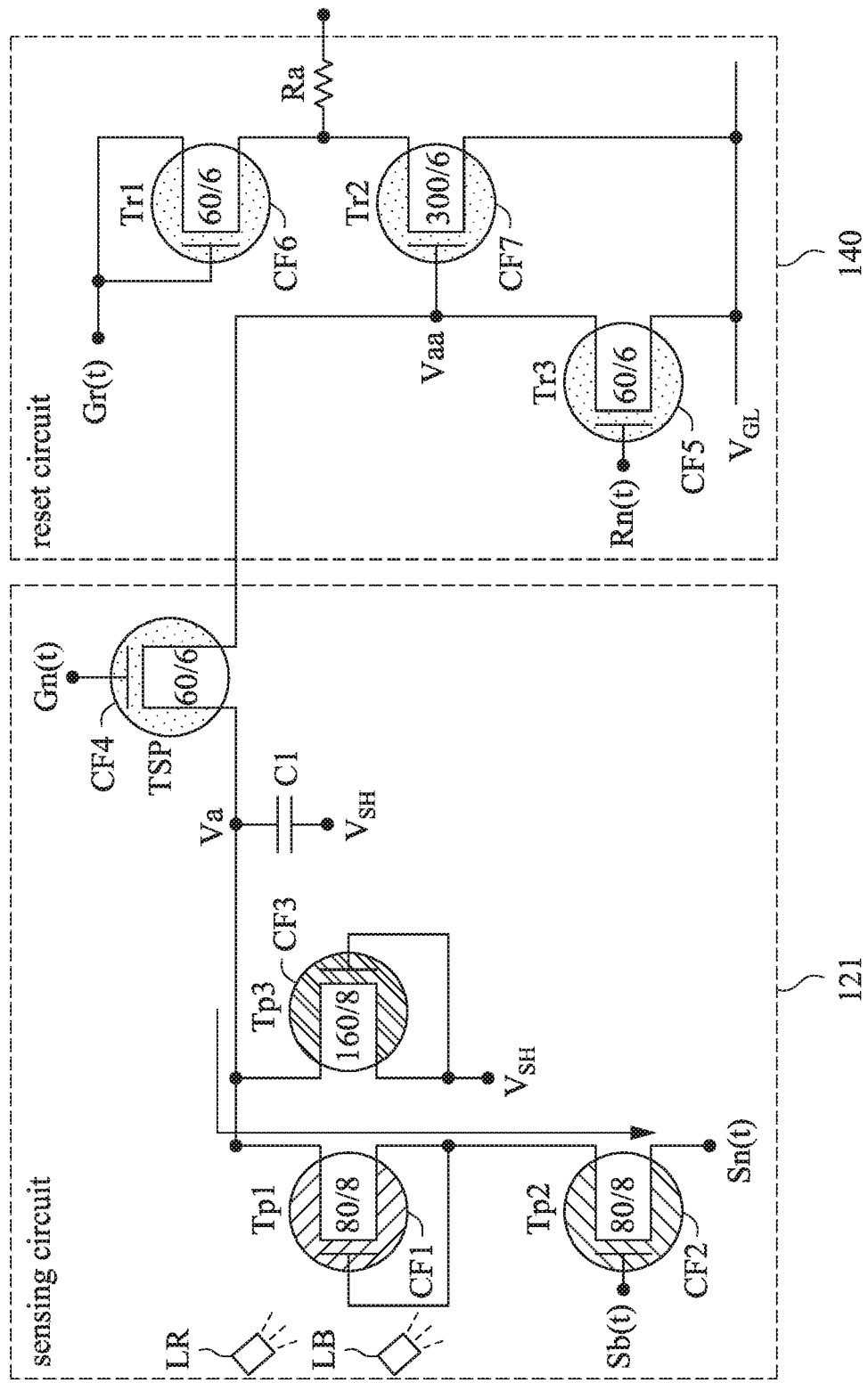
FIG. 9 is a schematic diagram illustrating operations of the optical sensing circuit illustrated by first color light and second color light according to the second embodiment of the present disclosure.
Figure 10:
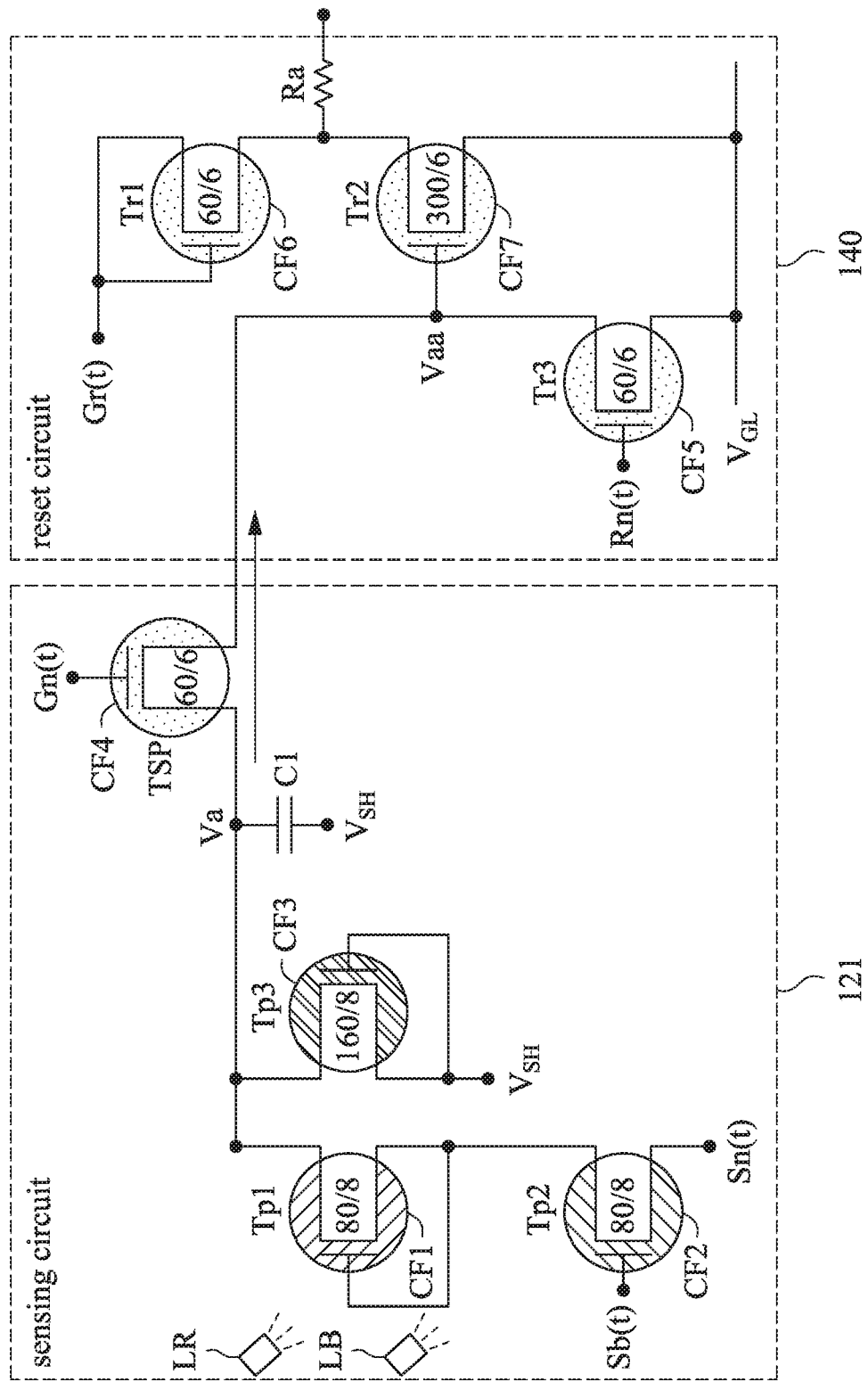
FIG. 10 is a schematic diagram illustrating operations of the optical sensing circuit during a sampling time according to the second embodiment of the present disclosure.

References are made to FIGS. 7-10. FIG. 7 is a schematic diagram illustrating an optical sensing circuit according to a second embodiment of the present disclosure. FIG. 8 is a timing diagram illustrating signals of the optical sensing circuit in FIG. 7. FIG. 9 is a schematic diagram illustrating operations of the optical sensing circuit illustrated by first color light and second color light according to the second embodiment of the present disclosure. FIG. 10 is a schematic diagram illustrating operations of the optical sensing circuit during a sampling time according to the second embodiment of the present disclosure.

The differences between a sensing circuit 121 in FIG. 7 and the sensing circuit 120 in FIG. 1 are that the control terminal of the first light sensor Tp1 in FIG. 7 is coupled to the first terminal of the second light sensor Tp2, the control terminal of the second light sensor Tp2 in FIG. 7 is configured to receive a second sensing signal Sb(t), and the first terminal of the third light sensor Tp3 and the capacitor C1 in FIG. 7 are coupled to the voltage source. In this embodiment, the voltage source is arranged to be the high voltage $V_{SH}$, and the optical sensing circuit 100a is a discharge-type optical sensing circuit. The second sensing signal Sb(t) is used to control a voltage at the control terminal of the second light sensor Tp2 to limit the current of the second light sensor Tp2.

Under the condition that there is only the ambient white light, during the sensing time, the current flowing through the third light sensor Tp3 is equal to the current flowing through the first light sensor Tp1 and equal to the current flowing through the second light sensor Tp2. The current generated by the third light sensor Tp3 would flow through the first light sensor Tp1 and the second light sensor Tp2. Because the current generated by the third light sensor Tp3 is larger than the current generated by the first light sensor Tp1 and the second light sensor Tp2, the capacitor C1 would be charged such that the sensing voltage Va is approximately equal to the high voltage $V_{SH}$. Similar to the condition of being illuminated by the ambient white light, the current generated by the third light sensor Tp3 would flow through the first light sensor Tp1 and the second light sensor Tp2 when the sensing circuit 121 is only illuminated by the red color light LR or the blue color light LB. Thus, the capacitor C1 would be charged such that the sensing voltage Va is kept to be approximately equal to the high voltage $V_{SH}$.

Reference is made to FIG. 9. When the sensing circuit 121 is simultaneously illuminated by the red color light LR and the blue color light LB, the current generated by the first light sensor Tp1 and the second light sensor Tp2 is larger than the current generated by the third light sensor Tp3 and the capacitor C1 is discharged such that the sensing voltage Va is approximately equal to the low voltage $V_{SL}$ of the first sensing signal Sn(t). Reference is made to FIG. 10. During the sampling time, the sensing voltage Va is outputted to the reset circuit 140. At this time, the voltage at the node Vaa is approximately equal to the low voltage $V_{SL}$ such that the transistor Tr2 is turned off and the voltage of the resistor Ra is approximately equal to the high voltage $V_{GH}$. During the reset time, the reset signal Rn(t) is the high voltage $V_{GH}$ to reset the voltage at the node Vaa.

Figure 11:
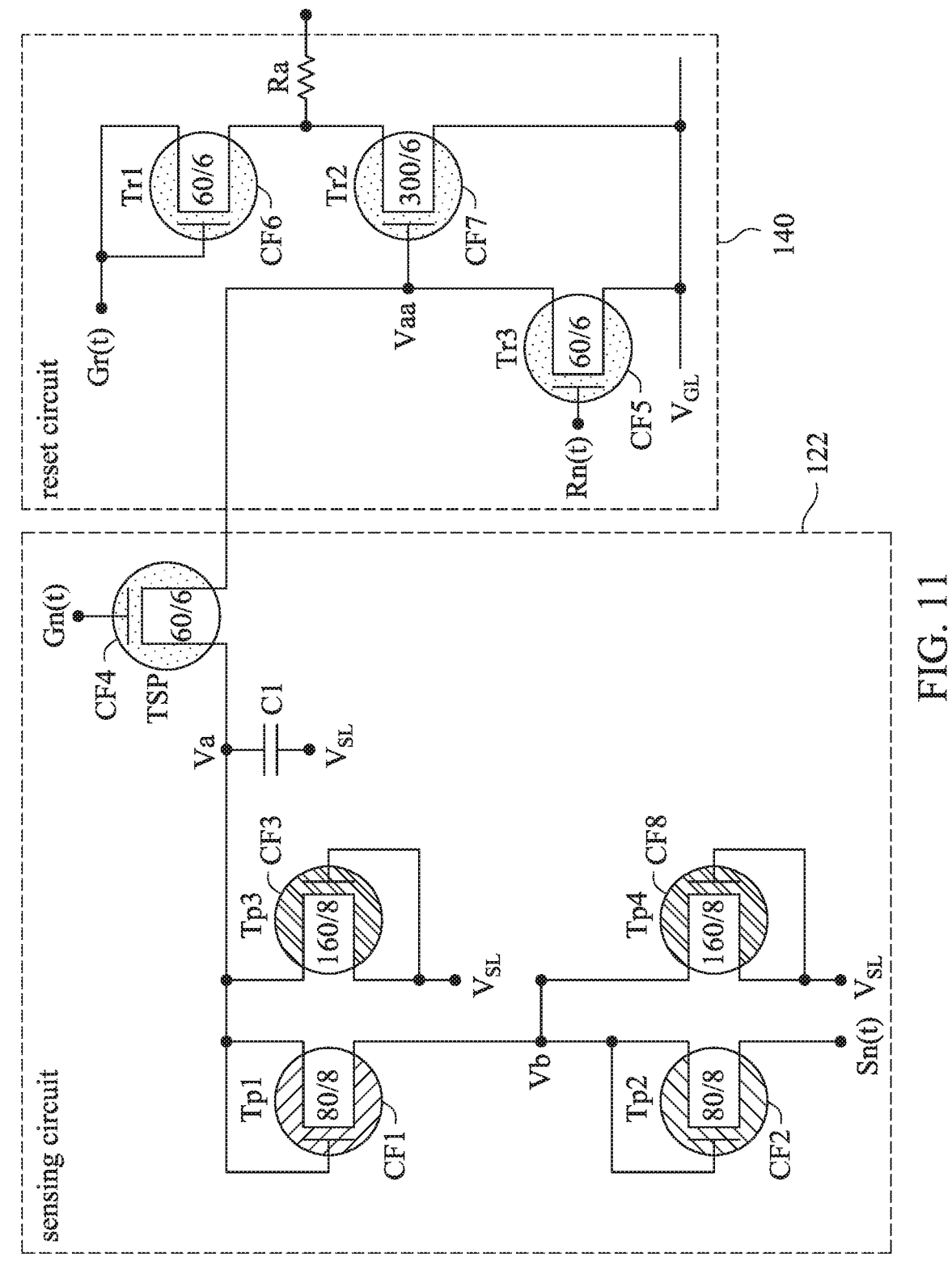
FIG. 11 is a schematic diagram illustrating an optical sensing circuit according to a third embodiment of the present disclosure.
Figure 12:
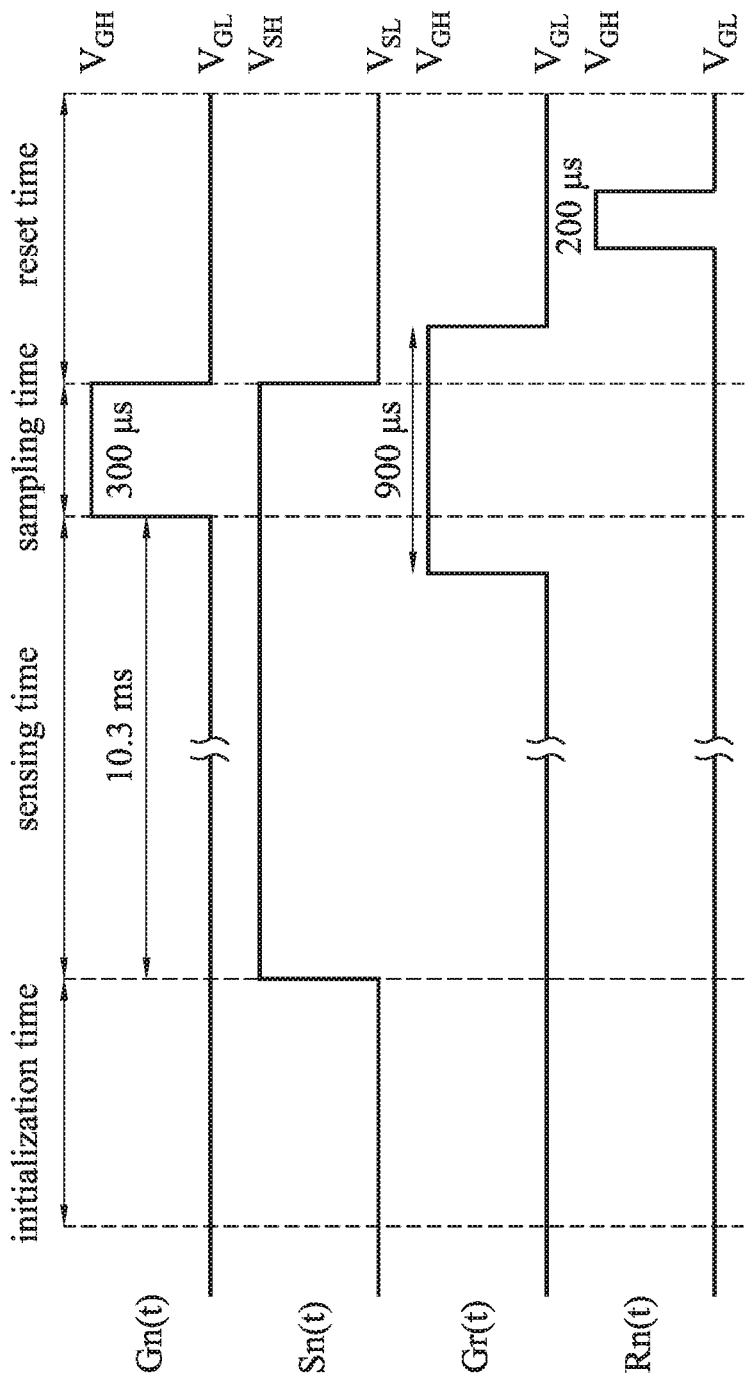
FIG. 12 is a timing diagram illustrating signals of the optical sensing circuit according to the third embodiment of the present disclosure.
Figure 13:
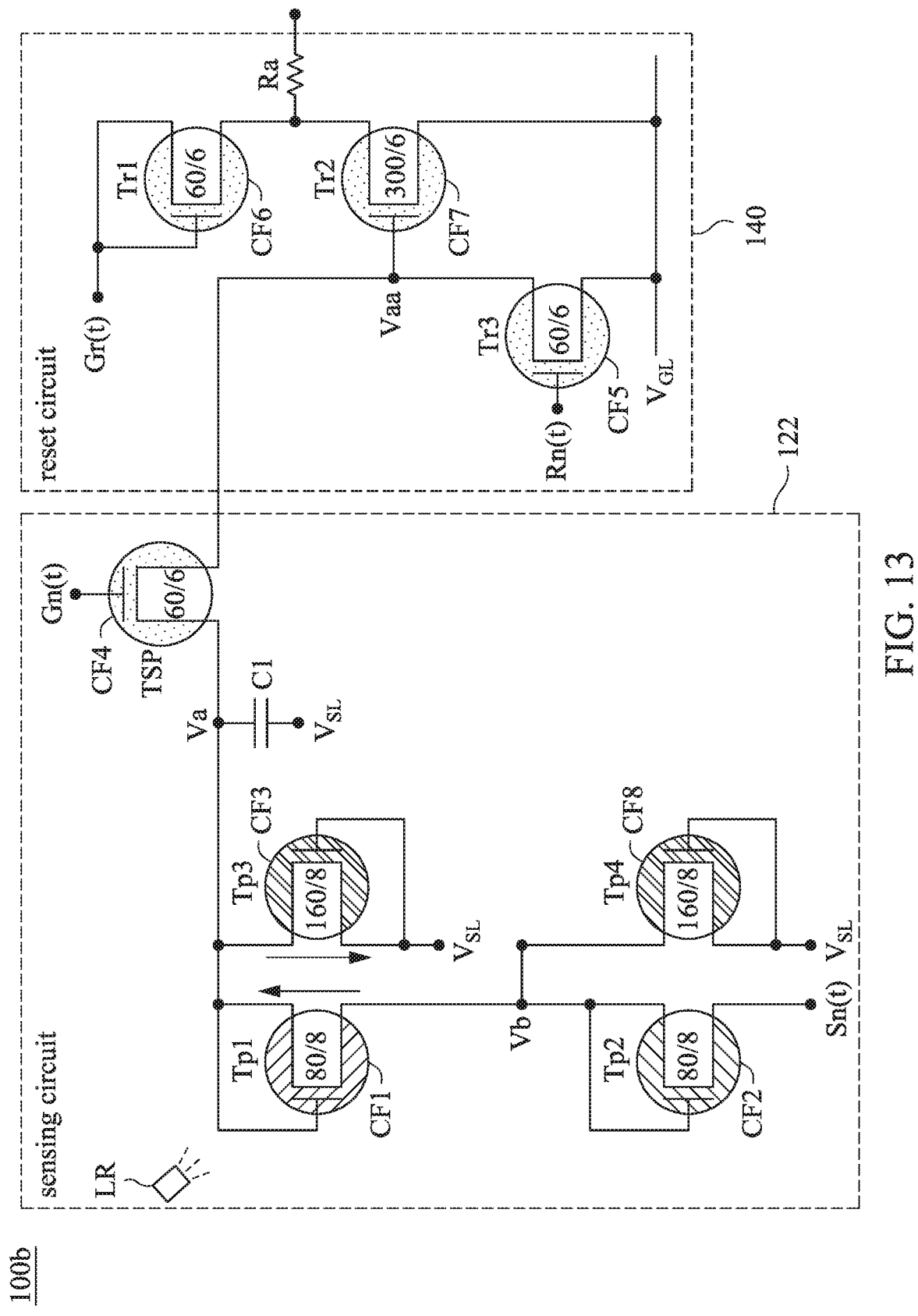
FIG. 13 is a schematic diagram illustrating operations of the optical sensing circuit illustrated by first color light according to the third embodiment of the present disclosure.
Figure 14:
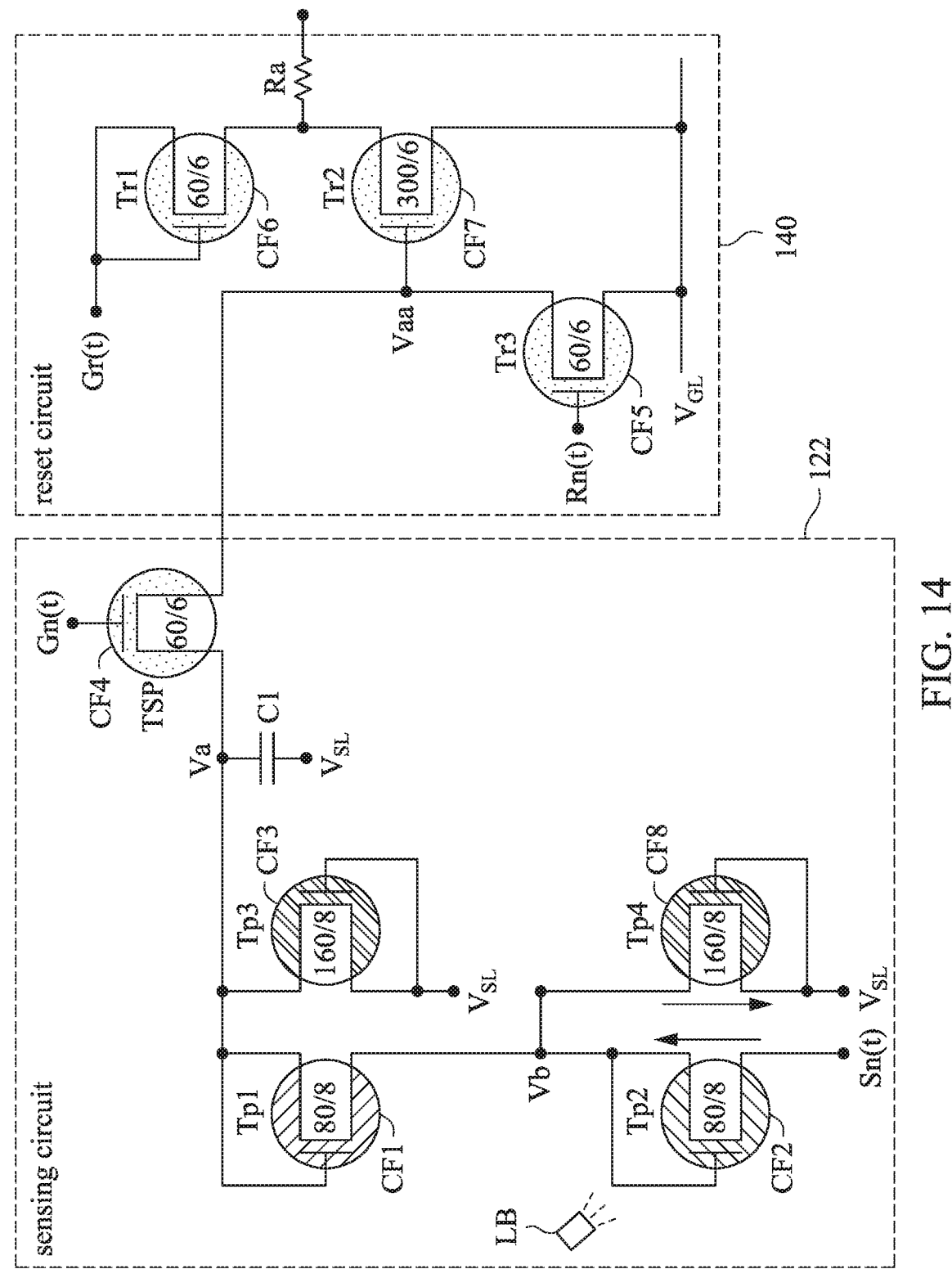
FIG. 14 is a schematic diagram illustrating operations of the optical sensing circuit illustrated by second color light according to the third embodiment of the present disclosure.
Figure 15:
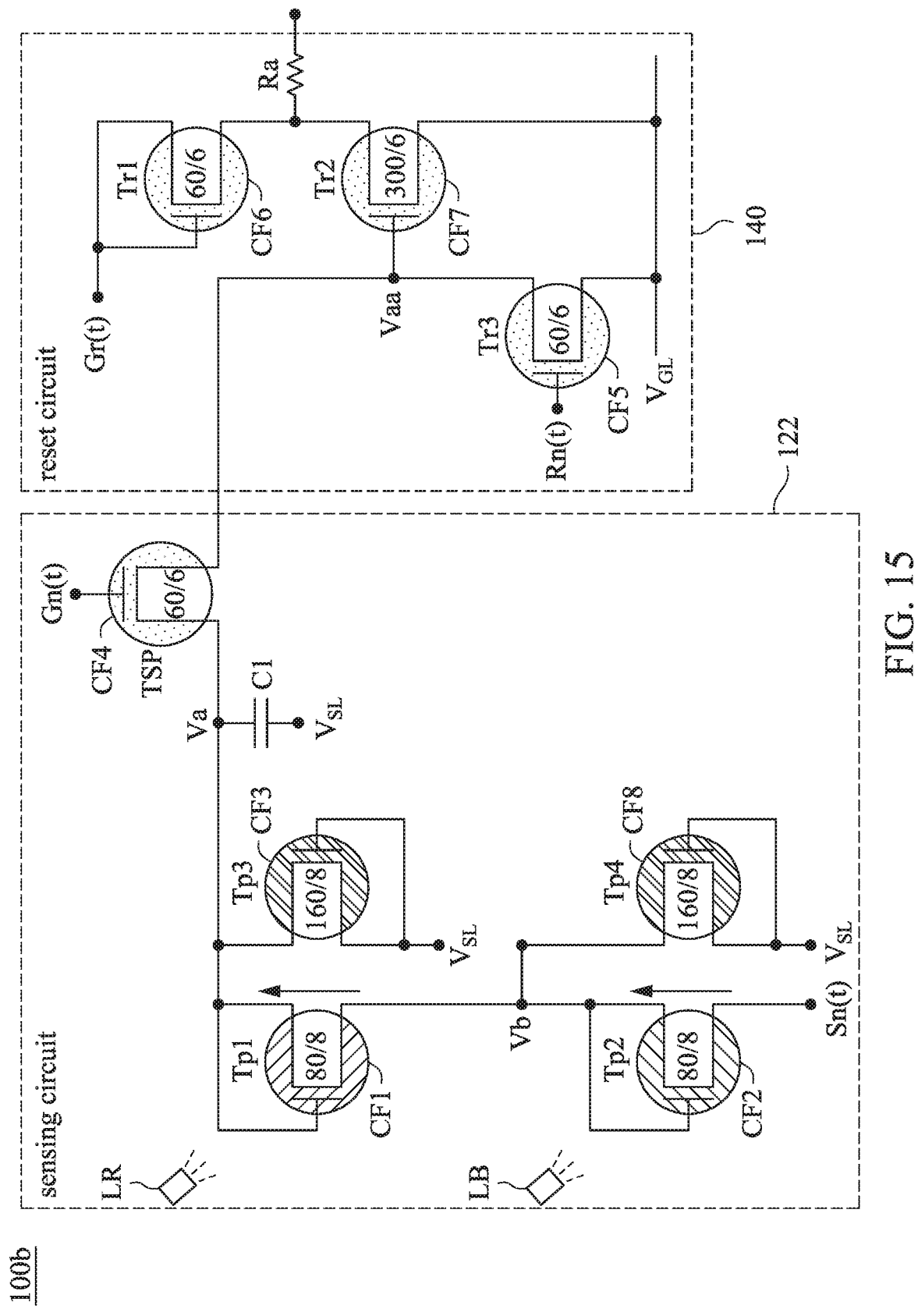
FIG. 15 is a schematic diagram illustrating operations of the optical sensing circuit illustrated by the first color light and the second color light according to the third embodiment of the present disclosure.
Figure 16:
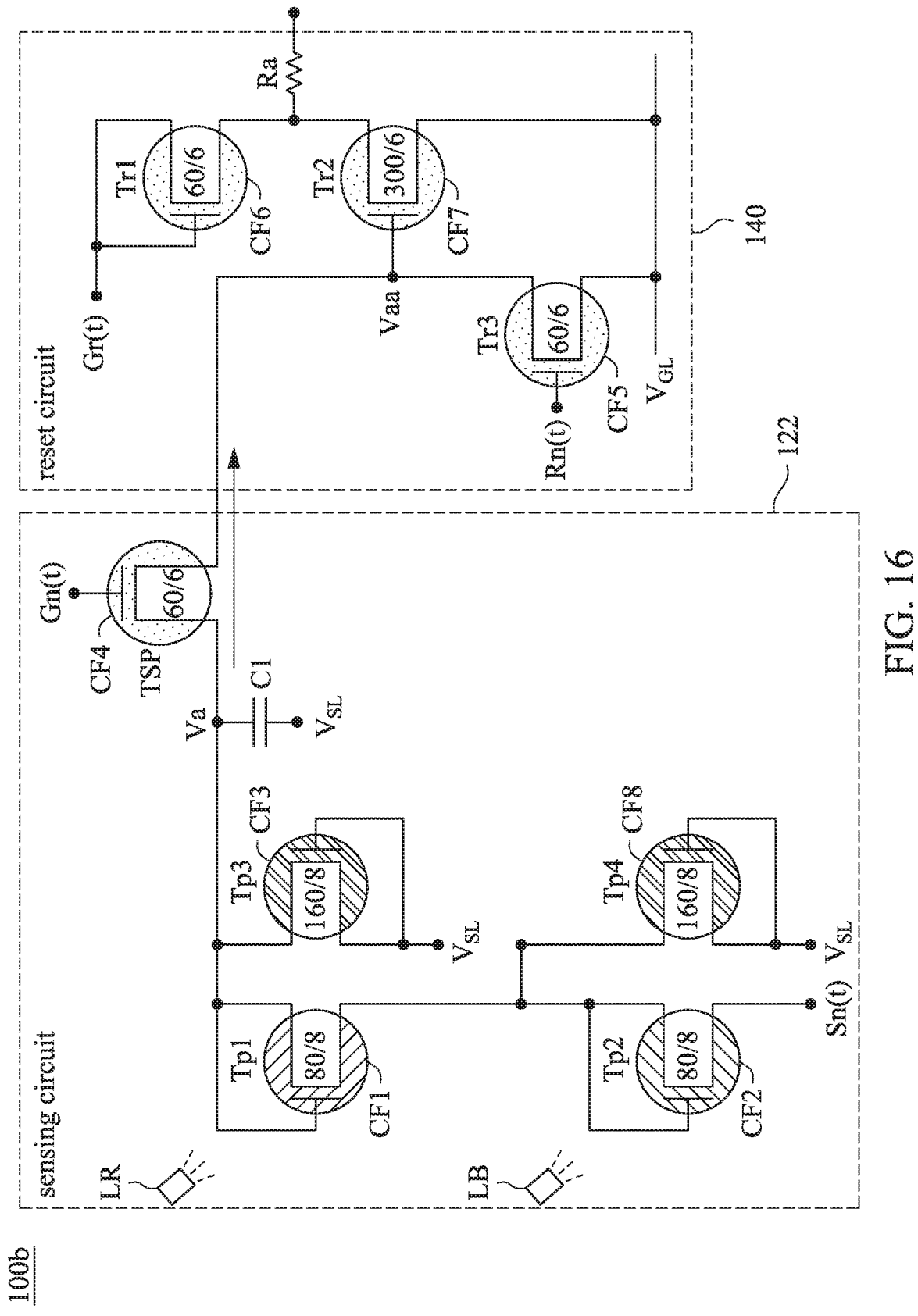
FIG. 16 is a schematic diagram illustrating operations of the optical sensing circuit during a sampling time according to the third embodiment of the present disclosure.

References are made to FIGS. 11-16. FIG. 11 is a schematic diagram illustrating an optical sensing circuit according to a third embodiment of the present disclosure. FIG. 12 is a timing diagram illustrating signals of the optical sensing circuit according to the third embodiment of the present disclosure. FIG. 13 is a schematic diagram illustrating operations of the optical sensing circuit illustrated by first color light according to the third embodiment of the present disclosure. FIG. 14 is a schematic diagram illustrating operations of the optical sensing circuit illustrated by second color light according to the third embodiment of the present disclosure. FIG. 15 is a schematic diagram illustrating operations of the optical sensing circuit illustrated by the first color light and the second color light according to the third embodiment of the present disclosure. FIG. 16 is a schematic diagram illustrating operations of the optical sensing circuit during a sampling time according to the third embodiment of the present disclosure. The differences between the sensing circuit 122 in FIG. 11 and the sensing circuit 121 in FIG. 10 are that the sensing circuit 122 in FIG. 11 further includes a fourth light sensor Tp4. The fourth light sensor Tp4 includes a first terminal, a second terminal, and a control terminal. The fourth light sensor Tp4 is covered by the eighth color filter CF8. In this embodiment, the eighth color filter CF8 is configured to transmit the third color light. Same as the third color filter CF3, the eighth color filter CF8 is indicated by double right oblique lines. The first terminal of the fourth light sensor Tp4 is coupled to the voltage source and the control terminal of the fourth light sensor Tp4. The second terminal of the fourth light sensor Tp4 is coupled to the first terminal of the second light sensor Tp2, the control terminal of the second light sensor Tp2, and the second terminal of the first light sensor Tp1. The control terminal of the first light sensor Tp1 is coupled to the first terminal of the first light sensor Tp1, the second terminal of the third light sensor Tp3, and the capacitor C1. The control terminal of the second light sensor Tp2 is coupled to the first terminal of the second light sensor Tp2.

Under the condition that there is only the ambient white light, during the sensing time, the current flowing through the second light sensor Tp2 is equal to a sum of the current flowing through the first light sensor Tp1 and the current flowing through the fourth light sensor Tp4. Most of the current generated by the second light sensor Tp2 would flow through the fourth light sensor Tp4 whose channel width is larger, such that a voltage at the node Vb is approximately equal to the low voltage $V_{SL}$. The current flowing through the first light sensor Tp1 is equal to the current flowing through the third light sensor Tp3, such that the sensing voltage Va is also approximately equal to the low voltage $V_{SL}$. The capacitor C1 is prevented from being charged when there is only the ambient white light.

Reference is made to FIG. 13. Similar to the condition that there is only the ambient white light, when the sensing circuit 122 is illuminated by the red color light LR, most of the current generated by the second light sensor Tp2 would flow through the fourth light sensor Tp4 whose channel width is larger, such that the voltage at the node Vb is approximately equal to the low voltage $V_{SL}$. Remain current would flow toward the first light sensor Tp1 and the third light sensor Tp3, such that the sensing voltage Va is approximately equal to the low voltage $V_{SL}$. The capacitor C1 is prevented from being charged under the condition of being illuminated by the red color light LR.

Reference is made to FIG. 14. When the sensing circuit 122 is illuminated by the blue color light LB, the current generated by the second light sensor Tp2 is larger, such that the voltage at the node Vb is approximately equal to the high voltage $V_{SH}$. When the current flows toward the first light sensor Tp1 and the third light sensor Tp3, the current would flow toward the third light sensor Tp3, such that the sensing voltage Va is approximately equal to the low voltage $V_{SL}$. The capacitor C1 is prevented from being charged under the condition of being illuminated by the blue color light LB.

Reference is made to FIG. 15. When the sensing circuit 122 is simultaneously illuminated by the red color light LR and the blue color light LB, the current generated by the second light sensor Tp2 is larger because of being illuminated by the blue color light LB, such that the voltage at the node Vb is approximately equal to the high voltage $V_{SH}$. The current generated by the first light sensor Tp1 is larger because of being illuminated by the red color light LR and the sensing voltage Va is approximately equal to the high voltage $V_{SH}$, such that the capacitor C1 is charged under the condition of being simultaneously illuminated by the red color light LR and the blue color light LB.

Reference is made to FIG. 16. During the sampling time, the sampling circuit TSP outputs the sensing voltage Va to the reset circuit 140. The operations of the reset circuit 140 are the same as the operations described with the FIG. 6, so they are not described herein.

Figure 17:
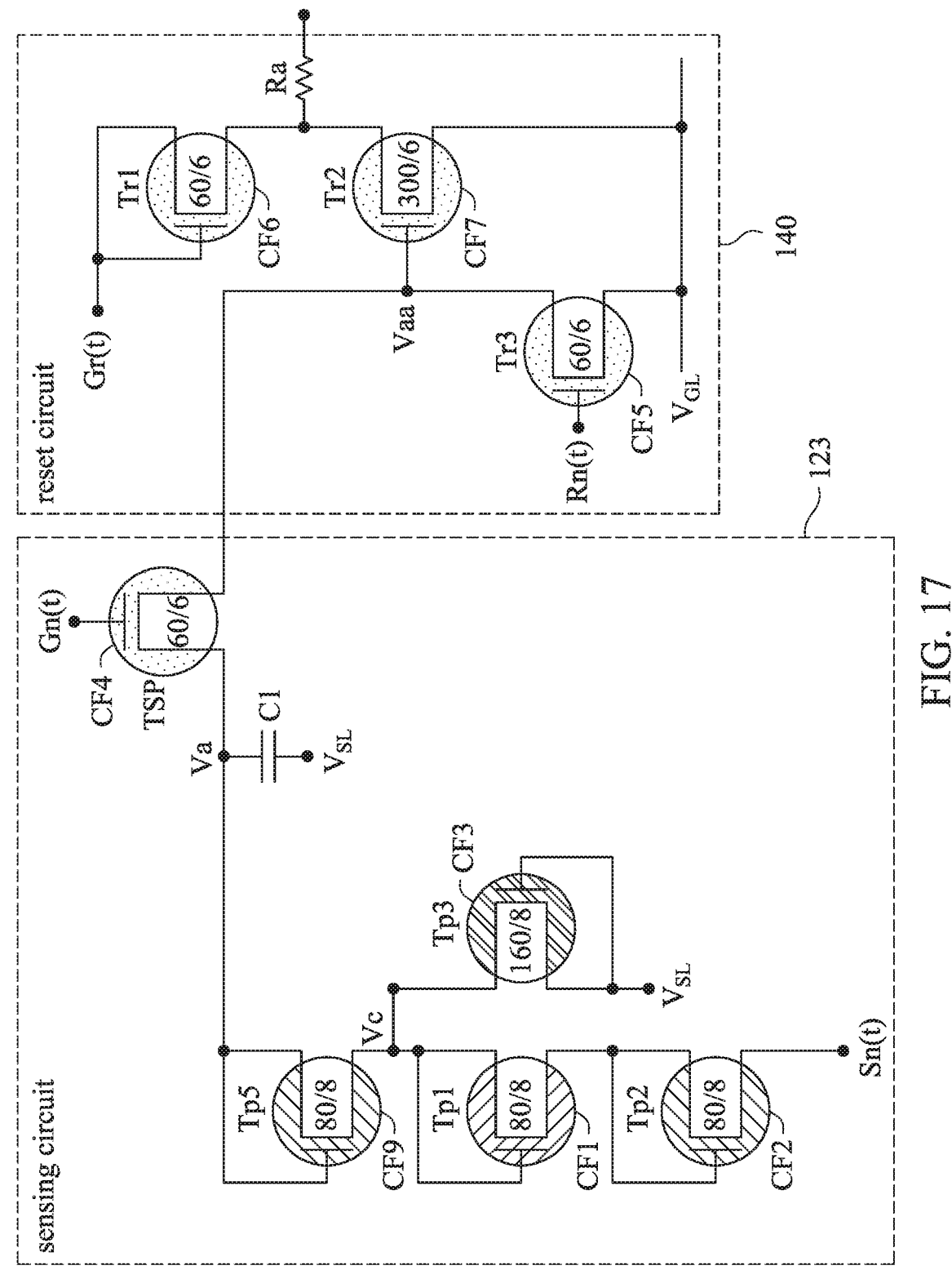
FIG. 17 is a schematic diagram illustrating an optical sensing circuit according to a fourth embodiment of the present disclosure.
Figure 18:
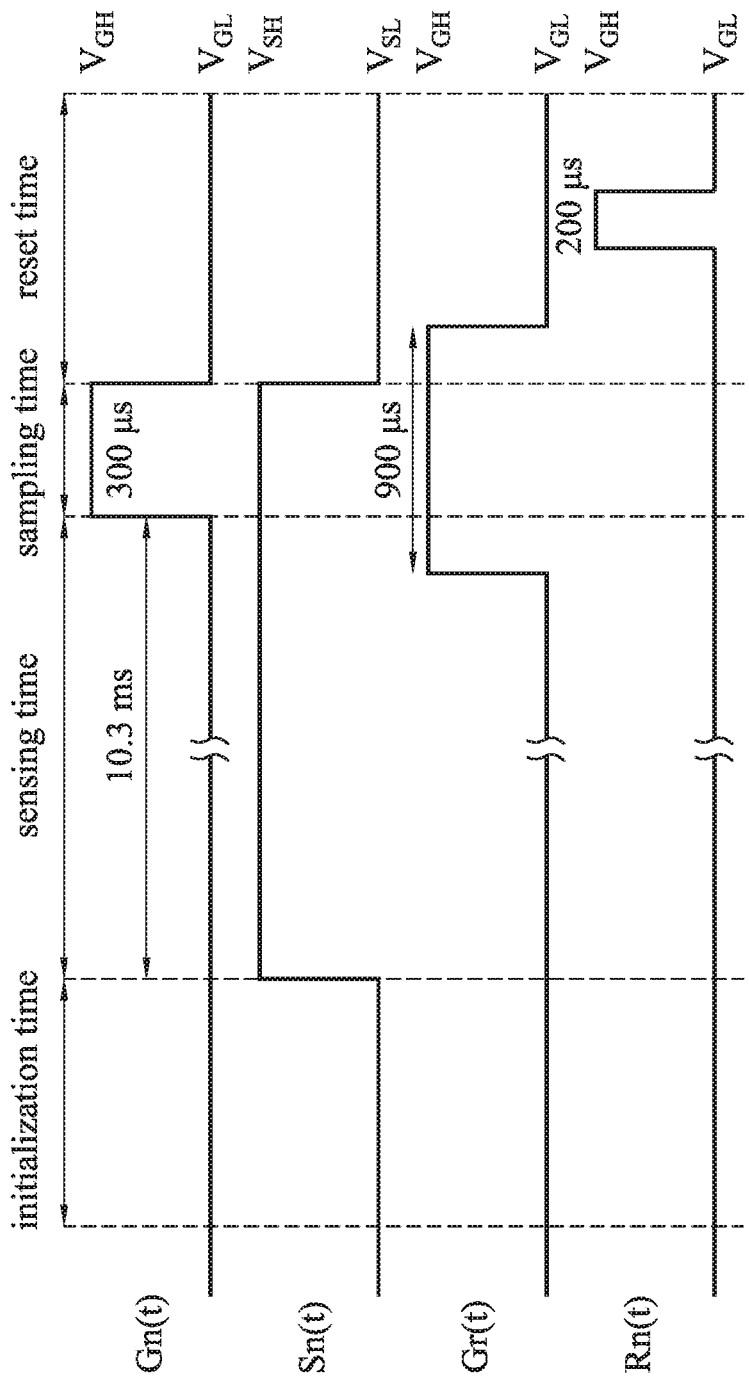
FIG. 18 is a timing diagram illustrating signals of the optical sensing circuit according to the fourth embodiment of the present disclosure.
Figure 19:
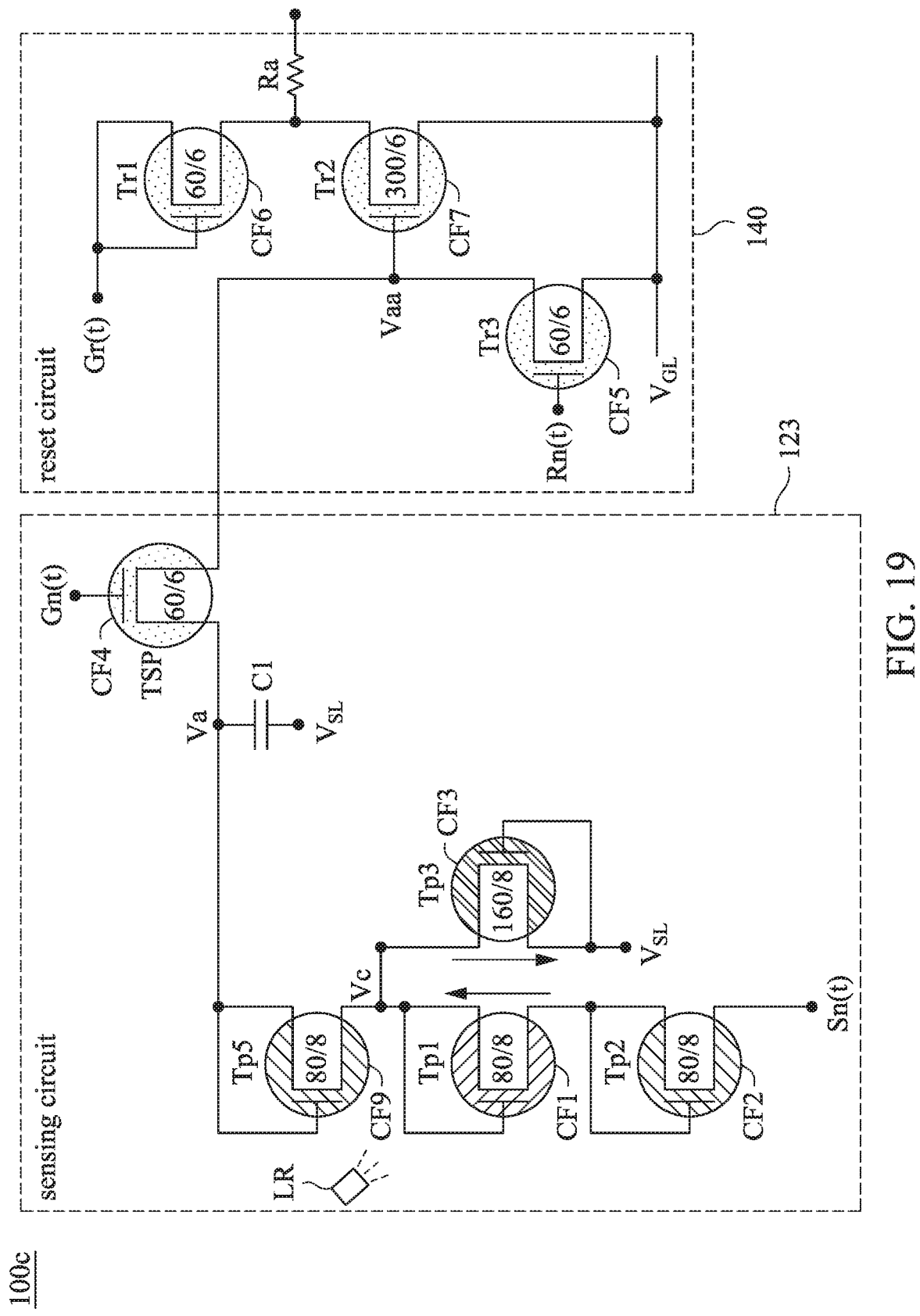
FIG. 19 is a schematic diagram illustrating operations of the optical sensing circuit illustrated by first color light according to the fourth embodiment of the present disclosure.
Figure 20:
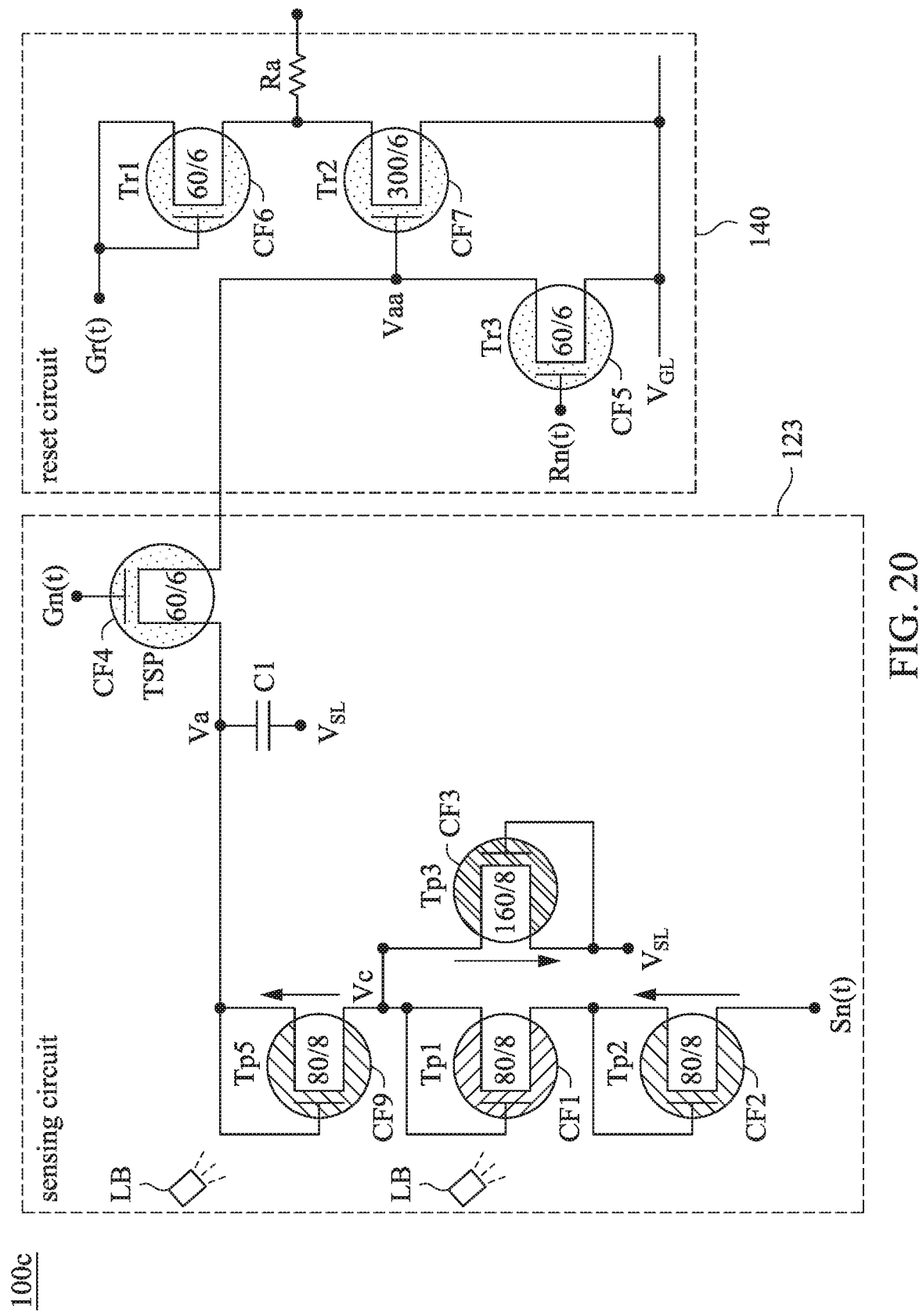
FIG. 20 is a schematic diagram illustrating operations of the optical sensing circuit illustrated by second color light according to the fourth embodiment of the present disclosure.
Figure 21:
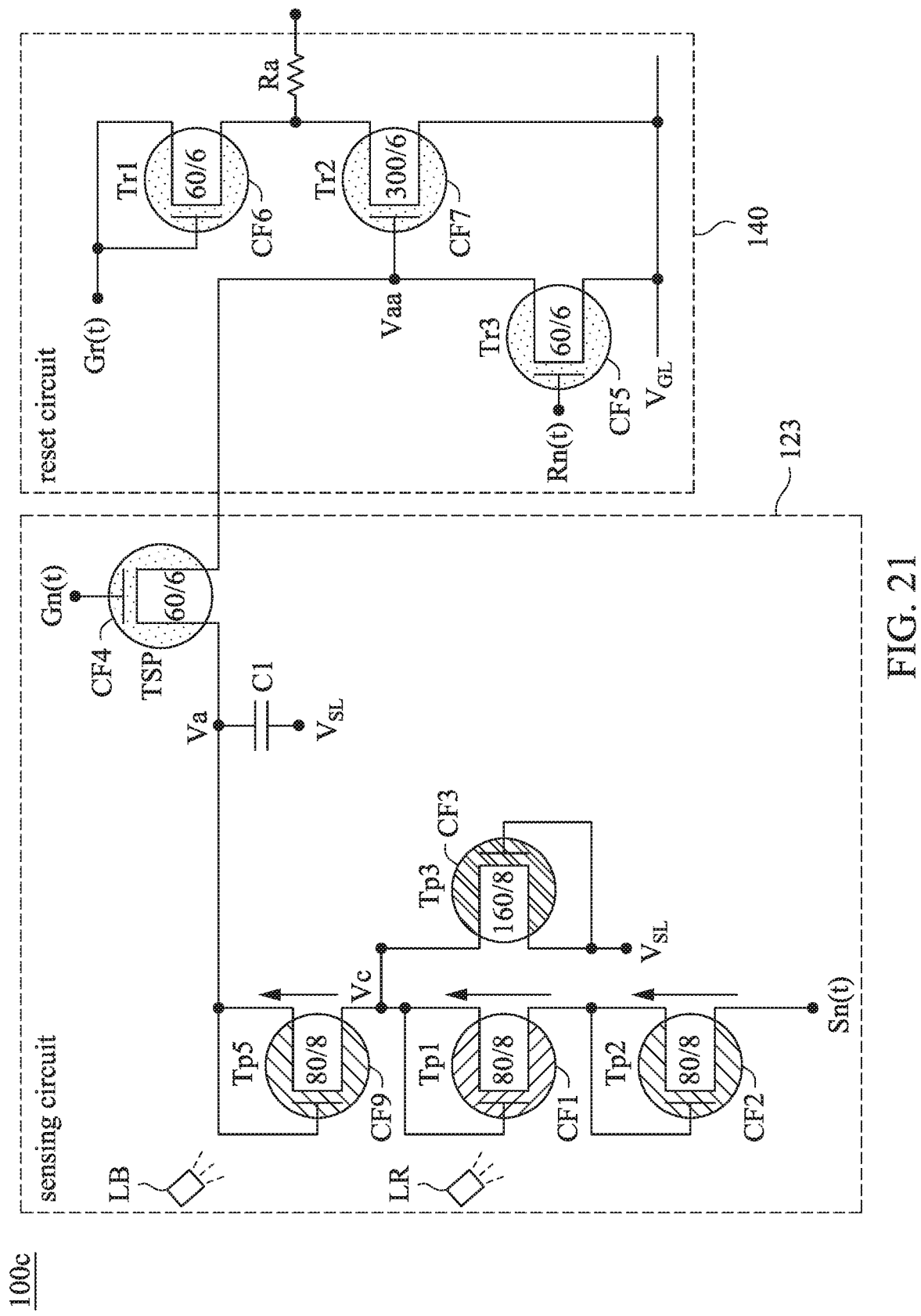
FIG. 21 is a schematic diagram illustrating operations of the optical sensing circuit illustrated by the first color light and the second color light according to the fourth embodiment of the present disclosure.
Figure 22:
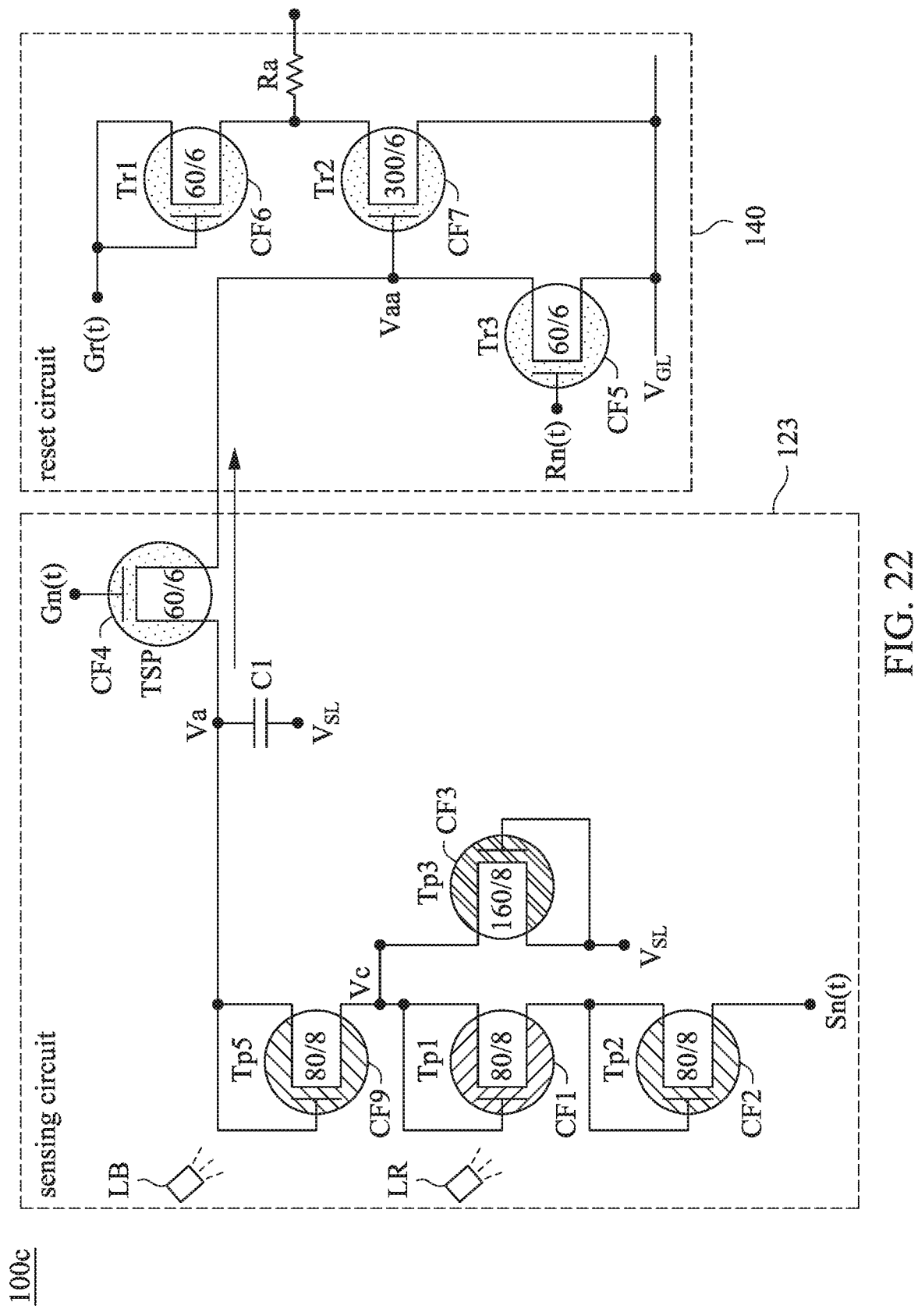
FIG. 22 is a schematic diagram illustrating operations of the optical sensing circuit during a sampling time according to the fourth embodiment of the present disclosure.

References are made to FIGS. 17-22. FIG. 17 is a schematic diagram illustrating an optical sensing circuit according to a fourth embodiment of the present disclosure. FIG. 18 is a timing diagram illustrating signals of the optical sensing circuit according to the fourth embodiment of the present disclosure. FIG. 19 is a schematic diagram illustrating operations of the optical sensing circuit illustrated by first color light according to the fourth embodiment of the present disclosure. FIG. 20 is a schematic diagram illustrating operations of the optical sensing circuit illustrated by second color light according to the fourth embodiment of the present disclosure. FIG. 21 is a schematic diagram illustrating operations of the optical sensing circuit illustrated by the first color light and the second color light according to the fourth embodiment of the present disclosure. FIG. 22 is a schematic diagram illustrating operations of the optical sensing circuit during a sampling time according to the fourth embodiment of the present disclosure. The differences between the sensing circuit 123 in FIG. 17 and the sensing circuit 122 in FIG. 11 are that the sensing circuit 123 in FIG. 17 further includes a fifth light sensor Tp5 and the fourth light sensor Tp4 of the sensing circuit 122 in FIG. 11 is replaced by the fifth light sensor Tp5. The fifth light sensor Tp5 includes a first terminal, a second terminal, and a control terminal. The first terminal of the fifth light sensor Tp5 is coupled to the capacitor C1, the sampling circuit TSP, and the control terminal of the fifth light sensor Tp5. The second terminal of the fifth light sensor Tp5 is coupled to the first terminal of the first light sensor Tp1 and the first terminal of the third light sensor Tp3. The fifth light sensor Tp5 is covered by the ninth color filter CF9. The ninth color filter CF9 is configured to transmit the second color light, and the second color light is, for example, the blue color. Same as the second color filter CF2, the ninth color filter CF9 is indicated by right oblique lines.

Under the condition that there is only the ambient white light, during the sensing time, the current flowing through the second light sensor Tp2 is equal to the current flowing through the first light sensor Tp1 and is equal to a sum of the current flowing through the fourth light sensor Tp4 and the current flowing through the fifth light sensor Tp5. At this time, the current generated by the second light sensor Tp2 is smaller, and most of the current flowing through the second light sensor Tp2 and the first light sensor Tp1 would flow toward the third light sensor Tp3 whose channel width is larger, such that a voltage at a node Vc is approximately equal to the low voltage $V_{SL}$, and the sensing voltage Va is also approximately equal to the low voltage $V_{SL}$.

Reference is made to FIG. 19. When the sensing circuit 123 is illuminated by the red color light LR, the current of the first light sensor Tp1 is limited because the second light sensor Tp2 is connected to the first light sensor Tp1 in series. Similar to the condition that there is only the ambient white light, most of the current flowing through the second light sensor Tp2 and the first light sensor Tp1 would flow toward the third light sensor Tp3 whose channel width is larger, such that the voltage at the node Vc is approximately equal to the low voltage $V_{SL}$, and the sensing voltage Va is also approximately equal to the low voltage $V_{SL}$.

Reference is made to FIG. 20. Similar to the condition of being illuminated by the red color light LR, the current of the second light sensor Tp2 is limited because the first light sensor Tp1 is connected to the second light sensor Tp2 in series. Most of the current flowing through the second light sensor Tp2 and the first light sensor Tp1 would flow toward the third light sensor Tp3 whose channel width is larger, such that the voltage at the node Vc is approximately equal to the low voltage $V_{SL}$, and the sensing voltage Va is also approximately equal to the low voltage $V_{SL}$.

Reference is made to FIG. 21. Under the condition of being simultaneously illuminated by the red color light LR and the blue color light LB, the current generated by the second light sensor Tp2 and the first light sensor Tp1 is larger. Thus, the voltage at the node Vc is approximately equal to the high voltage $V_{SH}$, such that the capacitor C1 is charged and the sensing voltage Va is also approximately equal to the high voltage $V_{SH}$.

Reference is made to FIG. 22. During the sampling time, the sensing circuit TSP outputs the sensing voltage Va to the reset circuit 140. The operations of the reset circuit 140 are the same as the operations described with the FIG. 6, so they are not described herein.

As one of above embodiments, the optical sensing circuit utilizes the light sensors connected in series to limit the current with each other, in order to prevent the optical sensing circuit from outputting wrong results when there is only the ambient white light or the optical sensing circuit is illuminated by single color light. It is ensured that the optical sensing circuit outputs correct sensing results only when the optical sensing circuit is illuminated by mixed color light having different color light.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical sensing circuit, comprising:
    a first light sensor, comprising a first terminal and a second terminal, wherein the first light sensor is covered by a first color filter, and the first color filter is configured to transmit a first color light;
    a capacitor, comprising a first terminal and a second terminal, wherein the first terminal of the capacitor is coupled to the first terminal of the first light sensor, and the second terminal of the capacitor is coupled to a voltage source;
    a second light sensor, comprising a first terminal and a second terminal, wherein the first terminal of the second light sensor is coupled to the second terminal of the first light sensor, and the second terminal of the second light sensor is configured to receive a first sensing signal, wherein the second light sensor is covered by a second color filter, and the second color filter is configured to transmit a second color light;
    a third light sensor, comprising a first terminal and a second terminal, wherein the first terminal of the third light sensor is coupled to the voltage source, and the second terminal of the third light sensor is coupled to the first terminal of the first light sensor and the first terminal of the capacitor, wherein the third light sensor is covered by a third color filter, and the third color filter is configured to transmit a third color light; and
    a sampling circuit, coupled to the first terminal of the first light sensor, the second terminal of the third light sensor, and the first terminal of the capacitor, wherein the sampling circuit is configured to receive a first sampling signal, and the sampling circuit outputs a voltage at the first terminal of the capacitor according to the first sampling signal.

2. The optical sensing circuit of claim 1, wherein the first light sensor comprises a control terminal, and the control terminal of the first light sensor is coupled to the first terminal of the first light sensor, wherein the second light sensor comprises a control terminal, and the control terminal of the second light sensor is coupled to the first terminal of the first light sensor and the control terminal of the first light sensor, wherein the third light sensor comprises a control terminal, and the control terminal of the third light sensor is coupled to the first terminal of the third light sensor.

3. The optical sensing circuit of claim 1, wherein the first light sensor comprises a control terminal, and the control terminal of the first light sensor is coupled to the second terminal of the first light sensor, wherein the second light sensor comprises a control terminal, and the control terminal of the second light sensor is configured to receive a second sensing signal, wherein the third light sensor comprises a control terminal, and the control terminal of the third light sensor is coupled to the first terminal of the third light sensor, the first terminal of the capacitor, and the sampling circuit.

4. The optical sensing circuit of claim 1, further comprising:
    a fourth light sensor, comprising a first terminal, a second terminal, and a control terminal, wherein the first terminal of the fourth light sensor is coupled to the control terminal of the fourth light sensor and the voltage source, and the second terminal of the fourth light sensor is coupled to the second terminal of the first light sensor and the first terminal of the second light sensor, wherein the fourth light sensor is covered by a fourth color filter, and the fourth color filter is configured to transmit the third color light,
    wherein the first light sensor comprises a control terminal, and the control terminal of the first light sensor is coupled to the first terminal of the first light sensor, wherein the second light sensor comprises a control terminal, and the control terminal of the second light sensor is coupled to the first terminal of the second light sensor, wherein the third light sensor comprises a control terminal, and the control terminal of the third light sensor is coupled to the first terminal of the third light sensor and the voltage source.

5. The optical sensing circuit of claim 1, wherein the first light sensor generates a current according to the first light color, the second light sensor generates a current according to the second light color, and the third light sensor generates a current according to the third light color.

6. The optical sensing circuit of claim 1, wherein a channel width of the third light sensor is larger than a channel width of the first light sensor and larger than the channel width of the second light sensor.

7. The optical sensing circuit of claim 1, wherein the optical sensing circuit operates in an operation mode, and the operation mode comprises an initialization time, a sensing time, a sampling time, and a reset time.

8. The optical sensing circuit of claim 7, wherein the optical sensing circuit charges or discharges the capacitor during the sensing time according to the first sensing signal.

9. The optical sensing circuit of claim 7, wherein the optical sensing circuit outputs a voltage at the first terminal of the capacitor during the sampling time according to the first sampling signal.

10. An optical sensing circuit, comprising:
- a first light sensor, comprising a first terminal and a second terminal, wherein the first light sensor is covered by a first color filter, and the first color filter is configured to transmit a first color light;
- a capacitor, comprising a first terminal and a second terminal, wherein the second terminal of the capacitor is coupled to a voltage source;
- a second light sensor, comprising a first terminal and a second terminal, wherein the first terminal of the second light sensor is coupled to the second terminal of the first light sensor, and the second terminal of the second light sensor is configured to receive a first sensing signal, wherein the second light sensor is covered by a second color filter, and the second color filter is configured to transmit a second color light;
- a third light sensor, comprising a first terminal and a second terminal, wherein the first terminal of the third light sensor is coupled to the voltage source, and the second terminal of the third light sensor is coupled to the first terminal of the first light sensor, wherein the third light sensor is covered by a third color filter, and the third color filter is configured to transmit a third color light;
- a fourth light sensor, comprising a first terminal, a second terminal, and a control terminal, wherein the first terminal of the fourth light sensor is coupled to the control terminal of the fourth light sensor and the first terminal of the capacitor, and the second terminal of the fourth light sensor is coupled to the first terminal of the first light sensor and the second terminal of the third light sensor, wherein the fourth light sensor is covered by a fourth color filter, and the fourth color filter is configured to transmit the second light color; and
- a sampling circuit, coupled to the first terminal of the fourth light sensor and the first terminal of the capacitor, wherein the sampling circuit is configured to receive a first sampling signal, and the sampling circuit outputs a voltage at the first terminal of the capacitor according to the first sampling signal;
- wherein the first light sensor comprises a control terminal, and the control terminal of the first light sensor is coupled to the first terminal of the first light sensor, wherein the second light sensor comprises a control terminal, and the control terminal of the second light sensor is coupled to the first terminal of the second light sensor, wherein the third light sensor comprises a control terminal, and the control terminal of the third light sensor is coupled to the first terminal of the third light sensor and the voltage source.

* * * * *